US011866881B2

United States Patent
Choi et al.

(10) Patent No.: US 11,866,881 B2
(45) Date of Patent: Jan. 9, 2024

(54) CLOTHING TREATMENT APPARATUS

(71) Applicant: LG Electronics Inc., Seoul (KR)

(72) Inventors: Junyoung Choi, Seoul (KR); Wansik Nam, Seoul (KR); Sunghoo Park, Seoul (KR); Hyeyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 17/262,419

(22) PCT Filed: Jul. 30, 2019

(86) PCT No.: PCT/KR2019/009498
§ 371 (c)(1),
(2) Date: Jan. 22, 2021

(87) PCT Pub. No.: WO2020/027554
PCT Pub. Date: Feb. 6, 2020

(65) Prior Publication Data
US 2021/0355626 A1    Nov. 18, 2021

Related U.S. Application Data

(60) Provisional application No. 62/711,629, filed on Jul. 30, 2018.

(51) Int. Cl.
*D06F 58/10*      (2006.01)
*D06F 34/34*      (2020.01)
(Continued)

(52) U.S. Cl.
CPC .............. *D06F 58/10* (2013.01); *B29C 44/14* (2013.01); *B29C 44/18* (2013.01); *B29C 44/38* (2013.01);
(Continued)

(58) Field of Classification Search
CPC ........ D06F 58/203; D06F 39/12; D06F 58/10; D06F 34/34; D06F 35/00; D06F 39/008;
(Continued)

(56) References Cited

U.S. PATENT DOCUMENTS

| 3,323,224 A | 6/1967 | Lough et al. |
| 3,672,188 A * | 6/1972 | Geschka ................. D06F 17/04 |
| | | 68/12.22 |

(Continued)

FOREIGN PATENT DOCUMENTS

| CN | 1055335 A | 10/1991 |
| CN | 1170061 A | 1/1998 |

(Continued)

OTHER PUBLICATIONS

International Search Report and Written Opinion dated Nov. 22, 2019 in PCT/KR2019/009499 (7 pages).

(Continued)

*Primary Examiner* — Benjamin L Osterhout
(74) *Attorney, Agent, or Firm* — Birch, Stewart, Kolasch & Birch, LLP

(57) ABSTRACT

The present disclosure relates to a clothing treatment apparatus comprising: a cabinet having a first side panel and a second side panel, an upper panel and a lower panel, and a rear panel; a first base having a front panel which is fixed to the first side panel, the second side panel, the upper panel, and the lower panel and forms a front surface of the cabinet, and an input hole which is provided to penetrate the front panel; a first chamber which is positioned in the cabinet and provides a space for accommodating clothes; a second base; a second chamber; a supply unit in the second chamber and supplying at least one of air and moisture into the first chamber; and a heat insulation unit formed by foaming (Continued)

plastic in a foam space formed between the cabinet, the first base, the first chamber, and the second base.

20 Claims, 17 Drawing Sheets

(51) Int. Cl.

| | | |
|---|---|---|
| *D06F 58/20* | (2006.01) | |
| *D06F 73/02* | (2006.01) | |
| *D06F 39/00* | (2020.01) | |
| *D06F 39/14* | (2006.01) | |
| *B29C 44/14* | (2006.01) | |
| *B29C 44/18* | (2006.01) | |
| *B29C 44/38* | (2006.01) | |
| *D06F 58/12* | (2006.01) | |
| *D06F 58/24* | (2006.01) | |
| *D06F 58/02* | (2006.01) | |
| *D06F 87/00* | (2006.01) | |
| *D06F 34/28* | (2020.01) | |
| *D06F 39/12* | (2006.01) | |
| *D06F 35/00* | (2006.01) | |
| *B29L 31/00* | (2006.01) | |
| *B29K 23/00* | (2006.01) | |
| *B29K 25/00* | (2006.01) | |
| *B29K 75/00* | (2006.01) | |

(52) U.S. Cl.
CPC .............. *D06F 34/28* (2020.02); *D06F 34/34* (2020.02); *D06F 35/00* (2013.01); *D06F 39/008* (2013.01); *D06F 39/12* (2013.01); *D06F 39/14* (2013.01); *D06F 58/02* (2013.01); *D06F 58/12* (2013.01); *D06F 58/20* (2013.01); *D06F 58/203* (2013.01); *D06F 58/24* (2013.01); *D06F 73/02* (2013.01); *D06F 87/00* (2013.01); *B29K 2023/00* (2013.01); *B29K 2025/06* (2013.01); *B29K 2075/00* (2013.01); *B29K 2995/0015* (2013.01); *B29L 2031/762* (2013.01); *D06F 58/206* (2013.01)

(58) Field of Classification Search
CPC .......... D06F 34/28; D06F 58/26; D06F 87/00; D06F 58/24; D06F 73/02; D06F 58/20; D06F 39/14; D06F 58/12; D06F 58/206; B29C 44/14; B29C 44/18; B29C 44/38; B29K 2075/00; B29K 2025/06; B29K 2995/0015; B29K 2023/00; B29L 2031/762
See application file for complete search history.

(56) References Cited

U.S. PATENT DOCUMENTS

| | | | |
|---|---|---|---|
| 9,107,973 B1* | 8/2015 | Robinson | ................... A61L 2/10 |
| 11,236,939 B1* | 2/2022 | Harikrishnasamy | ........................ F25D 23/066 |
| 2004/0000175 A1 | 1/2004 | Bolduan et al. | |
| 2004/0041503 A1 | 3/2004 | Lee | |
| 2009/0151193 A1 | 6/2009 | Moon et al. | |
| 2009/0255141 A1 | 10/2009 | Moon et al. | |
| 2010/0058813 A1 | 3/2010 | Moon et al. | |
| 2010/0218566 A1 | 9/2010 | Moon et al. | |
| 2011/0016930 A1 | 1/2011 | Moon et al. | |
| 2011/0168217 A1 | 7/2011 | Neff et al. | |
| 2012/0096734 A1 | 4/2012 | Moon et al. | |
| 2012/0160269 A1 | 6/2012 | Pyo et al. | |
| 2012/0235551 A1 | 9/2012 | Park et al. | |
| 2012/0240425 A1 | 9/2012 | Park et al. | |
| 2012/0247157 A1 | 10/2012 | Park et al. | |
| 2014/0238086 A1 | 8/2014 | Choi et al. | |
| 2014/0298865 A1 | 10/2014 | Park et al. | |
| 2015/0020419 A1 | 1/2015 | Park et al. | |
| 2015/0159315 A1 | 6/2015 | Lim et al. | |
| 2016/0177500 A1 | 6/2016 | Yoon et al. | |
| 2019/0120546 A1* | 4/2019 | Hong | ....................... F25D 11/00 |

FOREIGN PATENT DOCUMENTS

| | | |
|---|---|---|
| CN | 2397169 Y | 9/2000 |
| CN | 1388350 A | 1/2003 |
| CN | 1456739 A | 11/2003 |
| CN | 1479066 A | 3/2004 |
| CN | 1896366 A | 1/2007 |
| CN | 101387071 A | 3/2009 |
| CN | 102016160 A | 4/2011 |
| CN | 101424037 B | 6/2011 |
| CN | 101812795 B | 8/2011 |
| CN | 102159760 A | 8/2011 |
| CN | 102388175 A | 3/2012 |
| CN | 102414361 A | 4/2012 |
| CN | 102656307 A | 9/2012 |
| CN | 102656312 A | 9/2012 |
| CN | 102679663 A | 9/2012 |
| CN | 103562458 A | 2/2014 |
| CN | 104321482 A | 1/2015 |
| CN | 104562600 A | 4/2015 |
| CN | 104846585 A | 8/2015 |
| CN | 204690363 U | 10/2015 |
| CN | 204825403 U | 12/2015 |
| CN | 205192057 U | 4/2016 |
| CN | 105714542 A | 6/2016 |
| CN | 106460301 A | 2/2017 |
| CN | 106467980 A | 3/2017 |
| CN | 206245092 U | 6/2017 |
| CN | 107142698 A | 9/2017 |
| CN | 207313967 U | 5/2018 |
| EP | 0 252 163 A1 | 1/1988 |
| EP | 0 324 589 A1 | 7/1989 |
| EP | 2 514 683 A1 | 10/2012 |
| EP | 2523989 A1 | 11/2012 |
| EP | 2 594 690 A1 | 5/2013 |
| EP | 2 759 632 A1 | 7/2014 |
| EP | 2 883 989 A1 | 6/2015 |
| EP | 3 321 414 A1 | 5/2018 |
| GB | 1 252 509 A | 11/1971 |
| GB | 2 111 142 A | 6/1983 |
| GB | 2511432 A | 9/2014 |
| JP | 48-43651 Y | 12/1973 |
| JP | 1-308597 A | 12/1989 |
| JP | 2-133787 A | 5/1990 |
| JP | 3-31273 U | 3/1991 |
| JP | 5-3876 U | 1/1993 |
| JP | 2000-225298 A | 8/2000 |
| JP | 2006-506187 A | 2/2006 |
| JP | 2008-309372 A | 12/2008 |
| JP | 2009-291427 A | 12/2009 |
| JP | 2012-171 A | 1/2012 |
| JP | 2013/208248 | 10/2013 |
| JP | 2015-190716 A | 11/2015 |
| KR | 20-0206221 | 12/2000 |
| KR | 10-2009-0014444 | 2/2009 |
| KR | 10-2009-0102402 | 9/2009 |
| KR | 10-2009-0124147 A | 12/2009 |
| KR | 10-2010-0007342 | 1/2010 |
| KR | 10-2011-0021169 A | 3/2011 |
| KR | 10-2011-0067833 | 6/2011 |
| KR | 10-2012-0074557 | 7/2012 |
| KR | 10-2013-0015240 A | 2/2013 |
| KR | 10-2014-0108454 | 9/2014 |
| KR | 10-2014-0120677 | 10/2014 |
| KR | 10-2015-0007055 | 1/2015 |
| KR | 10-2015-0085728 | 7/2015 |
| KR | 10-2018-0037459 | 4/2018 |
| KR | 10-2018-0052954 | 5/2018 |
| RU | 39604 U1 | 8/2004 |
| RU | 2 467 107 C1 | 11/2012 |
| RU | 2604312 C2 | 12/2016 |

(56) References Cited

FOREIGN PATENT DOCUMENTS

| SU | 1 707 110 A1 | 1/1992 |
|---|---|---|
| WO | WO 2009/020328 A2 | 2/2009 |
| WO | WO 2009/064143 A3 | 5/2009 |
| WO | WO 2011/074853 A1 | 6/2011 |
| WO | WO 2011/086076 A1 | 7/2011 |
| WO | WO 2014/108057 A1 | 7/2014 |
| WO | WO 2016/064251 A1 | 4/2016 |

OTHER PUBLICATIONS

International Search Report and Written Opinion dated Oct. 31, 2019 in PCT/KR2019/009476 (6 pages).
International Search Report and Written Opinion dated Oct. 31, 2019 in PCT/KR2019/09500 (8 pages).
PCT International Search Report and Written Opinion in corresponding Application No. PCT/KR2019/009478 dated Nov. 22, 2019 (6 pages).
Notice of Allowance issued in Russian Application No. 2021104062 dated Aug. 19, 2021 (12 pages).
Notice of Allowance issued in Russian Application No. 2021103321 dated Jul. 5, 2021 (7 pages).
Notice of Allowance issued in Russian Application No. 2021103392 dated Aug. 13, 2021 (14 pages).
Notice of Allowance issued in Russian Application No. 2021104063 dated Aug. 10, 2021. (10 pages).
Notice of Allowance issued in Russian Application No. 2021103395 dated Aug. 13, 2021. (11 pages).
Office Action for Indian Application No. 202117004656 dated Jul. 16, 2021 (7 Pages).
Written Opinion of the International Searching Authority for International Patent Application No. PCT/KR2019/009498 dated Nov. 21, 2019 (6 pages).

* cited by examiner (a)

CLOTHING TREATMENT APPARATUS

CROSS REFERENCES TO RELATED APPLICATIONS

This application is the National Phase of PCT International Application No. PCT/KR2019/009498, filed on Jul. 30, 2019, which claims priority under 35 U.S.C. § 119(e) to U.S. Provisional Application No. 62/711,629, filed on Jul. 30, 2018. The entire contents of the above-referenced applications are incorporated herein by reference.

TECHNICAL FIELD

The present disclosure relates to a laundry treating apparatus.

BACKGROUND

In general, a laundry treating apparatus is configured to perform various tasks related to laundry. The laundry treating apparatus conceptually includes a laundry washing machine for washing laundry, a laundry drying machine for drying wet laundry, and a refresher for removing odors or wrinkles from laundry.

A conventional laundry treating apparatus is designed to include a drum providing a space to accommodate laundry therein, a driving unit rotating the drum, and a supply unit supplying steam or hot-air to the drum. In the laundry treating apparatus of the above structure, steam or hot-air must be supplied to the laundry while the drum is rotating. Thus, the laundry input to the drum is not in a stretched state, so that wrinkles remain on the laundry.

To solve this problem, a conventional laundry treating apparatus is designed to include a cabinet, a first chamber disposed inside the cabinet to provide a space to accommodate laundry therein, a second chamber disposed inside the cabinet to provide a space separate from the first chamber, and a supply unit that is disposed in the second chamber and supplies steam or hot-air to the first chamber.

The laundry treating apparatus (as disclosed in Korean patent application publication number 10-2011-0067833) having the above-described structure allows the laundry to be maintained in a stretched state inside the first chamber, thereby to solve the problem of the conventional apparatus that deodorization and wrinkle removal are performed while the drum is rotated.

However, the conventional laundry treating apparatuses that supply steam and hot-air while the laundry is received in the first chamber have a disadvantage that the first chamber may not thermally insulated because a separate insulating material is not disposed between the cabinet and the first chamber. Thus, the conventional laundry treating apparatuses may have low energy efficiency problem.

Further, in the conventional laundry treating apparatuses, the cabinet, the first chamber, and the second chamber are fixed to a frame disposed between the cabinet and the chambers. Thus, when the laundry treating apparatus vibrates, the cabinet embodied as a metal plate amplifies vibration and noise.

Further, the conventional laundry treating apparatuses have a disadvantage of requiring a separate member to reinforce a strength of the cabinet in order to minimize vibration or noise caused by the cabinet.

SUMMARY

Technical Problem

A purpose of the present disclosure is to provide a laundry treating apparatus in which a thermal insulator is disposed in a space defined between a cabinet defining an appearance of the apparatus and a chamber providing a space to accommodate laundry therein.

Further, a purpose of the present disclosure is to provide a laundry treating apparatus in which the thermal insulator is embodied as a foam plastic inserted into the space defined between the cabinet and the chamber.

Further, a purpose of the present disclosure is to provide a laundry treating apparatus having a fastening structure capable of preventing leakage of the foam plastic inserted into the space defined between the cabinet and the chamber into an inside of the chamber or out of the cabinet.

Further, a purpose of the present disclosure is to provide a laundry treating apparatus in which a foam plastic is inserted into between the cabinet and the chamber to minimize vibration of the cabinet.

Further, a purpose of the present disclosure is to provide a laundry treating apparatus including a hinge bracket that may prevent damage to a chamber defining structure due to a load of a door.

Technical Solution

The present disclosure provides a laundry treating apparatus including a cabinet having a laundry inlet defined therein; a first chamber fixed to the cabinet to provide a space to accommodate therein laundry, wherein the space communicates with the laundry inlet; a second chamber fixed to the cabinet and located under the first chamber, wherein a second chamber has a space defined therein separated from the first chamber; a supply unit disposed inside the second chamber and configured to supply at least one of air or steam to the first chamber; a door that opens and closes the laundry inlet; a hinge that couples the door to the cabinet such that the door is pivotable relative to the cabinet; a hinge bracket disposed in a space between a top surface of the first chamber and a top surface of the cabinet, wherein the hinge is fixed to the hinge bracket; and a thermal insulator inserted into a foam space defined between the cabinet and the first chamber, a foam space defined between the cabinet and the second chamber, and a foam space defined between the first chamber and the second chamber.

The hinge bracket may include a first hinge bracket to which a first hinge is fixed, wherein the first hinge couples the door to a portion above the laundry inlet such that the door is pivotable relative to the cabinet, and a second hinge bracket to which a second hinge is fixed, wherein the second hinge couples the door to a portion below the laundry inlet such that the door is pivotable relative to the cabinet.

The thermal insulator may be embodied as a foam plastic. Thus, the apparatus according to the present disclosure may minimize loss of heat energy supplied to the first chamber.

The present disclosure provides a laundry treating apparatus comprising: a cabinet including: a first side panel and a second side panel opposite to each other; a top panel and a bottom panel connecting the first side panel and the second side panel to each other and defining top and bottom surfaces of the cabinet, respectively; and a rear panel defining a rear surface of the cabinet; a first base including: a front panel fixed to the first side panel, the second side panel, the top panel, and the bottom panel and defining a front surface of the cabinet; and a laundry inlet extending through the front panel; a first chamber fixed to the front panel and disposed inside the cabinet, wherein the first chamber has a laundry receiving space defined therein communicating with the laundry inlet; a second base including: a front frame disposed between the front panel and the rear panel; a top frame extending from the front frame toward the rear panel and spaced apart from a bottom surface of the first chamber; and a first side frame spaced apart from the first side panel, and a second side frame spaced apart from the second side panel; a second chamber defined by the front frame, the top frame, the first side frame, the second side frame, the bottom panel, and the rear panel; a supply unit disposed inside the second chamber to supply at least one of air or moisture to the first chamber; a door for opening and closing the laundry inlet; a first hinge for connecting the door to a portion of the front panel disposed above the laundry inlet; a second hinge for connecting the door to a portion of the front panel disposed below the laundry inlet; a first hinge bracket fixed to the front panel and disposed inside the cabinet, wherein the first hinge bracket fixes the first hinge to the front panel; and a thermal insulator including a foam plastic inserted into a foam space defined between the cabinet, the first base, the first chamber, and the second base.

In one implementation, the foam space includes: a space defined between the first chamber and the top panel; a space defined between the first chamber and the first side panel; a space defined between the first chamber and the second side panel; a space defined between the first chamber and the rear panel; a space defined between the first chamber and the top frame; a space defined between the front panel and the front frame; a space defined between the first side frame and the first side panel; and a space defined between the second side frame and the second side panel.

In one implementation, the foam plastic includes one of polyurethane, polystyrene, and polyolefin.

In one implementation, the apparatus further comprises: a first mounting portion recessed in the front panel toward an inside of the cabinet; a first first-hinge mounting portion disposed on a left side of the first mounting portion, wherein the first first-hinge mounting portion protrudes from the front panel toward the inside of the cabinet, and the first first-hinge mounting portion has a first groove defined therein, wherein the first hinge is fixedly received in the first groove; a second first-hinge mounting portion disposed on a right side of the first mounting portion, wherein the second first-hinge mounting portion protrudes from the front panel toward the inside of the cabinet, and the second first-hinge mounting portion has a second groove defined therein, wherein the first hinge is fixedly received in the second groove; a second mounting portion recessed in an exposed surface of the front panel toward the inside of the cabinet; a first second-hinge mounting portion disposed on a left side of the second mounting portion, wherein the first second-hinge mounting portion protrudes from the front panel toward the inside of the cabinet, and the first second-hinge mounting portion has a third groove defined therein, wherein the second hinge is fixedly received in the third groove; and a second second-hinge mounting portion disposed on a right side of the second mounting portion, wherein the second second-hinge mounting portion protrudes from the front panel toward the inside of the cabinet, and the second second-hinge mounting portion has a fourth groove defined therein, wherein the second hinge is fixedly received in the fourth groove.

In one implementation, the first hinge bracket includes: a bracket body fixed to the first mounting portion and disposed in a space defined between the first chamber and the top panel; first receiving portions defined in the bracket body and constructed to accommodate therein the first first-hinge mounting portion; and second receiving portions defined in the bracket body and constructed to accommodate therein the second first-hinge mounting portion.

In one implementation, the apparatus further comprises: a first position-fixing portion protruding from the first mounting portion toward the bracket body; and a second position-fixing portion defined in the bracket body and constructed to accommodate therein the first position-fixing portion.

In one implementation, the bottom panel includes: a first bottom panel having a front surface fixed to the front panel, a rear surface fixed to the front frame, and both side surfaces fixed to a bottom surface of the first side panel and a bottom surface of the second side panel, respectively; and a second bottom panel having a front surface connected to a rear surface of the first bottom panel, and both side surfaces fixed to a bottom surface of the first side panel and a bottom surface of the second side panel, respectively, wherein the second bottom panel is disposed below the second base.

In one implementation, the apparatus further comprises a panel connector for connecting a rear surface of the first bottom panel and a front surface of the second bottom panel to each other.

In one implementation, the apparatus further comprises: a first second-hinge bracket for fixing the first second-hinge mounting portion and the first bottom panel; a second second-hinge bracket for fixing the second second-hinge mounting portion and the first bottom panel; a first leg coupled to at least one of the first second-hinge bracket or the first bottom panel; and a second leg coupled to at least one of the second second-hinge bracket or the first bottom panel.

In one implementation, the first second-hinge bracket includes: a first front-panel fixing plate fixed to the first second-hinge mounting portion, wherein the second hinge is detachably coupled to the first front-panel fixing plate; and a first bottom-panel fixing plate extending from the first front-panel fixing plate, wherein the first bottom panel is fixed to the first bottom-panel fixing plate, wherein the second second-hinge bracket includes: a second front-panel fixing plate fixed to the second second-hinge mounting portion, wherein the second hinge is detachably coupled to the second front-panel fixing plate; and a second bottom-panel fixing plate extending from the second front-panel fixing plate, wherein the first bottom panel is fixed to the second bottom-panel fixing plate.

In one implementation, the apparatus further comprises: a control panel fixed to the door, wherein the control panel includes at least one of a display for displaying a control command or an input interface for receiving a control command; a control unit disposed inside the second chamber; a first panel through-hole extending through the front panel, and communicating with the second mounting portion; a second panel through-hole extending through the front panel, and communicating with the second mounting portion; a first chamber through-hole extending through the front frame; a second chamber through-hole extending through the front frame; a first wire guide for connecting the first panel through-hole and the first chamber through-hole to each other, wherein a wire connecting the control panel and the control unit to each other is insertable into the first wire guide; and a second wire guide for connecting the second panel through-hole and the second chamber through-hole to each other, wherein a wire connecting the control panel and the control unit to each other is insertable into the second wire guide.

In one implementation, the apparatus further comprises: a first guide through-hole extending through the first front-panel fixing plate, wherein the first wire guide is inserted into the first guide through-hole; and a second guide through-hole extending through the second front-panel fixing plate, wherein the second wire guide is inserted into the second guide through-hole.

In one implementation, the apparatus further comprises: a first cover body detachably disposed on the first mounting portion to prevent exposure of the first first-hinge mounting portion and the second first-hinge mounting portion to an outside; a first hinge through-hole extending through the first cover body, wherein the first hinge is inserted into the first hinge through-hole; a first door magnetic body disposed in the door; a first cover magnet disposed in the first cover body for providing an attractive force pulling the door magnetic body toward the first cover body.

In one implementation, the apparatus further comprises: a second cover body detachably disposed on the second mounting portion to prevent exposure of the first second-hinge mounting portion and the second second-hinge mounting portion to an outside; and a second hinge through-hole extending through the second cover body, wherein the second hinge is inserted into the second hinge through-hole.

In one implementation, the apparatus further comprises: a third receiving portion embodied as a groove recessed in the front panel, wherein the third receiving portion is positioned between a bottom of the laundry inlet and a top of the second mounting portion; a third cover body detachably coupled to the third receiving portion; a second door magnetic body disposed in the door; and a third cover magnet disposed in the third cover body for providing an attractive force pulling the second door magnetic body toward the third cover body.

Technical Effects

The present disclosure may realize the laundry treating apparatus in which the thermal insulator is disposed in the space defined between the cabinet defining the appearance of the apparatus and the chamber providing the space to accommodate laundry therein.

Further, the present disclosure may realize the laundry treating apparatus in which the thermal insulator is embodied as the foam plastic inserted into the space defined between the cabinet and the chamber.

Further, the present disclosure may realize the laundry treating apparatus having the fastening structure capable of preventing leakage of the foam plastic inserted into the space defined between the cabinet and the chamber into an inside of the chamber or out of the cabinet.

Further, the present disclosure may realize the laundry treating apparatus in which the foam plastic is inserted into between the cabinet and the chamber to minimize vibration of the cabinet.

Further, the present disclosure may realize the laundry treating apparatus including the hinge bracket that may prevent damage to a chamber defining structure due to a load of the door.

BRIEF DESCRIPTION OF THE DRAWINGS

FIG. 7, FIG. 8, and FIG. 9 show one example of each of a top panel, a first side panel, a second side panel, a bottom panel, and a rear panel constituting a cabinet.

DETAILED DESCRIPTION

Figure 1:
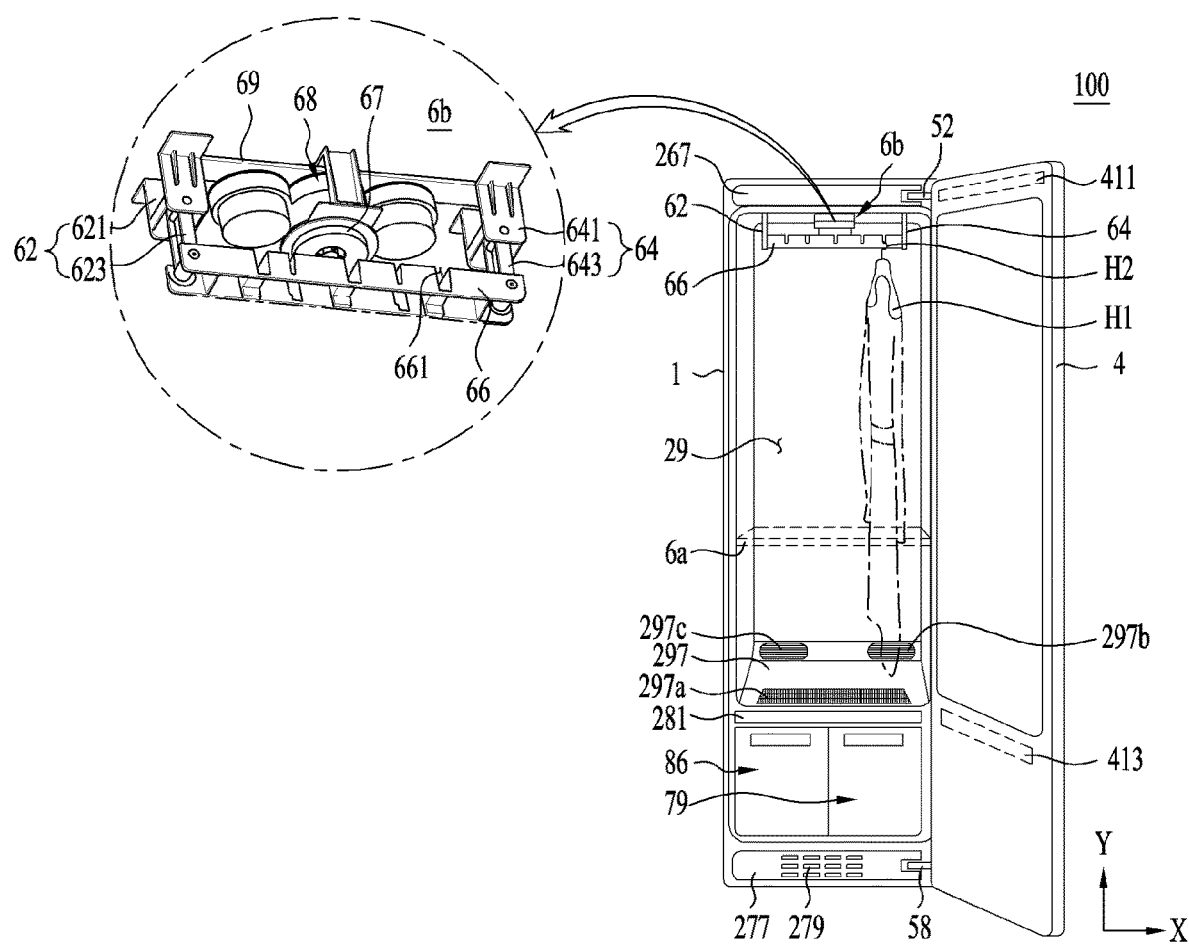
FIG. 1 shows an example of a laundry treating apparatus according to the present disclosure.

Hereinafter, a preferred embodiment of the present disclosure will be described in detail with reference to the accompanying drawings. A configuration or a control method of an apparatus to be described below is only intended for describing an embodiment of the present disclosure, and is not intended to limit a scope of the present disclosure. The same reference numerals used herein represent the same elements.

Figure 2:
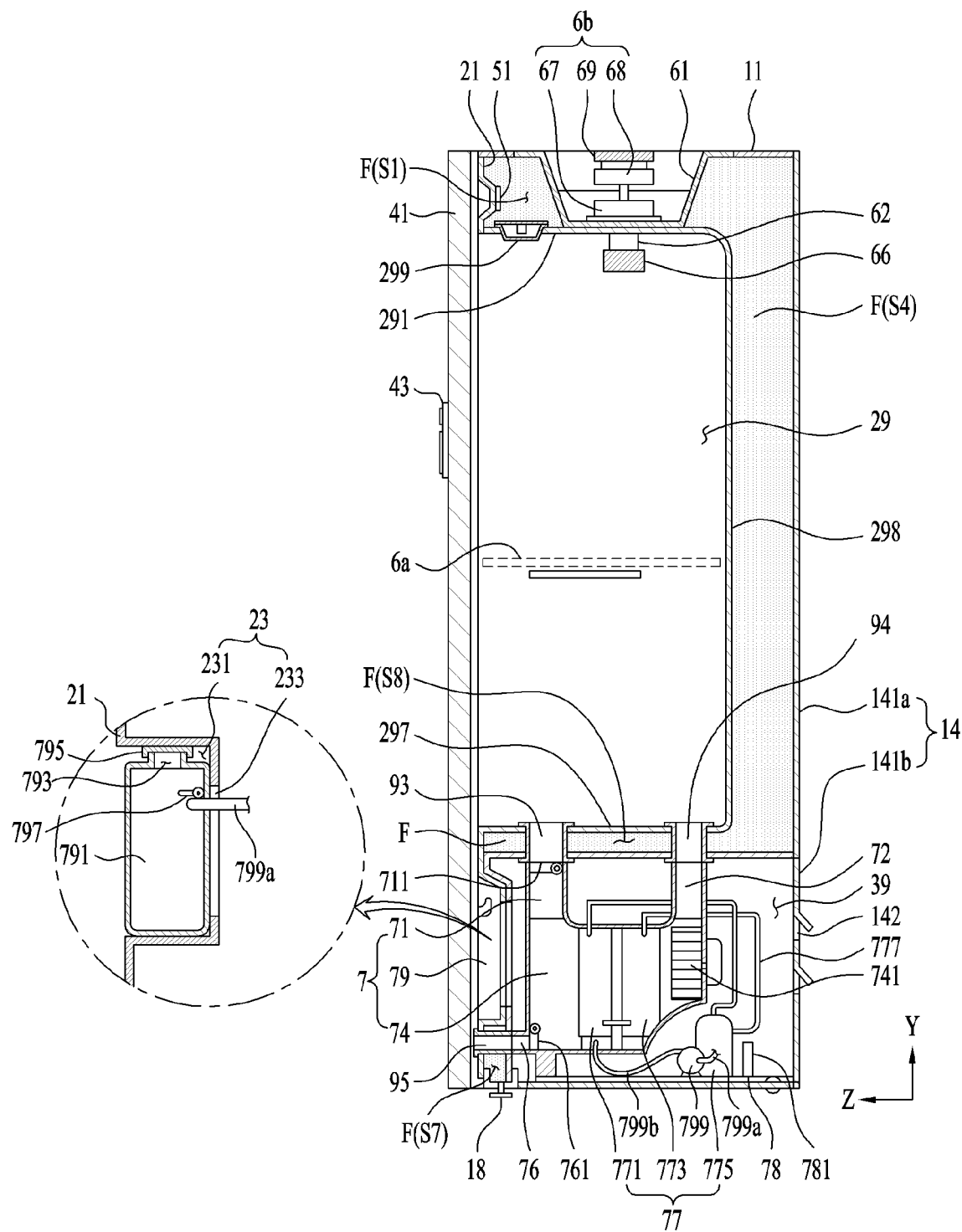
FIG. 2 shows an example of an air supply unit included in a laundry treating apparatus according to the present disclosure.
Figure 3:
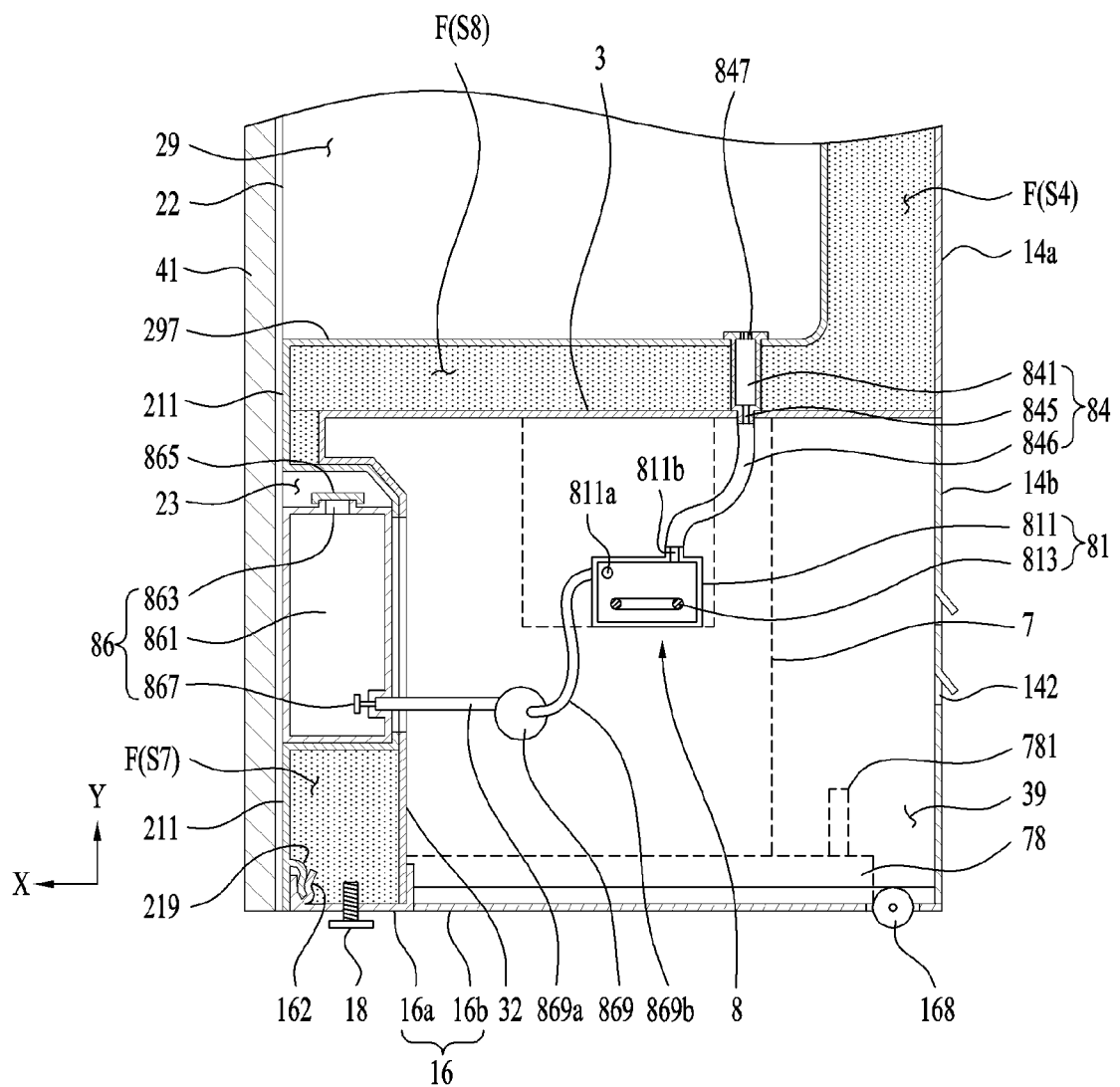
FIG. 3 shows an example of a moisture supply unit included in a laundry treating apparatus according to the present disclosure.

As shown in FIG. 1, a laundry treating apparatus according to the present disclosure 100 includes a cabinet 1 defining an appearance of the apparatus, and a first chamber 29 disposed inside the cabinet to provide a space to accommodate laundry therein. As shown in FIG. 2, a second chamber 39 is disposed below the first chamber and defines a space separated from the first chamber and is defined inside the cabinet. The second chamber 39 contains therein supply units 7 and 8 configured to supply at least one of moisture and air to the first chamber 29. FIG. 2 and FIG. 3 illustrate a case where both an air supply unit 7 and a moisture supply unit 8 are disposed in the second chamber 39.

As shown in FIG. 2, the air supply unit 7 may be configured to include a circulation duct 71, 72, and 74 disposed in the second chamber 39, a heat exchanger 77 that sequentially performs dehumidification and heating of air introduced into the circulation duct, and a water collector 79 that discharges condensate water generated from the heat exchanger to an outside of the second chamber 39.

The circulation duct may be configured to include an intake duct 71 constructed to communicate with the first chamber 29, a discharge duct 72 constructed to communicate with the first chamber 29, and a connection duct 74 connecting the intake duct and the discharge duct to each other.

A fan 741 is disposed at the circulation duct to sequentially move air from the first chamber 29 along the intake duct, the connection duct, and the discharge duct. FIG. 2 shows an example where the fan 741 is installed at the connection duct 74.

The heat exchanger 77 may be embodied as any device as long as the device dehumidifies the air introduced into the intake duct 71, and heats the dehumidified air. FIG. 2 shows an example where the heat exchanger 77 is embodied as a heat pump.

In other words, the heat exchanger 77 in FIG. 2 may be configured to include a refrigerant pipe 777 that defines a circulation channel of the refrigerant, a first heat exchanger 771 that is fixed to the refrigerant pipe and is disposed inside the connection duct 74, a second heat exchanger 773 which is fixed to the refrigerant pipe and disposed between the first heat exchanger 771 and the fan 741, a compressor 775 that allows the refrigerant to circulate between the two heat exchangers 771 and 773 along the refrigerant pipe, and a pressure adjuster (not shown) that controls a pressure of the refrigerant pipe. The compressor 775 and the pressure adjuster may be disposed outside the circulation duct 71, 72, and 74.

The first heat exchanger 771 may be embodied as an evaporator that transfers heat of the air flowing into the intake duct 71 to the refrigerant to cool the air and evaporate the refrigerant. In this case, the moisture contained in the air will travel along a surface of the first heat exchanger 771 and be collected on a bottom surface of the connection duct 74.

The second heat exchanger 773 may be embodied as a condenser that transfers heat of the refrigerant that has passed through the compressor 775 to the air that has passed through the first heat exchanger, thereby heating the air, and condensing the refrigerant.

As shown in FIG. 3, the circulation duct 71, 72, and 74 and the compressor 775 may be fixed to a receiving-portion body 78 disposed inside the second chamber 39. The receiving-portion body 78 may be configured to be withdrawn out of the second chamber 39 when a portion 14b of a rear panel 14 defining a rear surface of the cabinet 1 is removed from the cabinet.

A user will be able to withdraw the air supply unit 7 out of the second chamber by drawing the receiving-portion body 78 out of the second chamber 39. Thus, the receiving-portion body 78 may facilitate inspection of the air supply unit 7. Further, the control unit 781 that controls various devices disposed in the laundry treating apparatus 100 including the heat exchanger 77 may also be disposed on the receiving-portion body 78. In this case, the control unit 781 is preferably disposed at a position such that the control unit is exposed to an outside when the portion 14b of the rear panel is separated from the cabinet 1.

As shown in FIG. 2, the water collector 79 may be configured to include a drainage tank 791 disposed outside the second chamber 39 to provide a space for storing water therein, a drainage tank through-hole passing through the drainage tank 791, a first discharge pipe 799a inserted into the drainage tank through-hole, a second discharge pipe 799b which discharges condensate water discharged from the first heat exchanger 771 to an outside of the circulation duct, and a discharge pump 799 which moves condensate water discharged into the second discharge pipe 799b to the first discharge pipe 799a.

The drainage tank 791 may be removably disposed on a front surface of the cabinet 1. In this case, a check valve 797 may be disposed at the drainage tank through-hole. The check valve 797 is configured to allow the first discharge pipe 799a to be inserted into the drainage tank through-hole, but to prevent the water inside the drainage tank from being discharged through the drainage tank through-hole. Thus, when the drainage tank 791 is coupled to a front surface of the cabinet, the control unit 781 will be able to transfer the condensate water inside the circulation duct to the drainage tank 791 through the discharge pump 799.

A discharge hole 793 that discharges the condensate water stored in the drainage tank 791 is defined in one surface of the drainage tank 791. FIG. 2 illustrates an example where the discharge hole 793 is defined in a top surface of the drainage tank. The discharge hole 793 may be opened and closed by a lid 795 detachably disposed on the drainage tank.

Furthermore, the air supply unit 7 may be configured to dehumidify air in an indoor space in which the laundry treating apparatus according to the present disclosure 100 is installed. To this end, the air supply unit 7 may further include am outside-air duct 76 that communicates the circulation duct 71, 72, and 74 with an outside of the second chamber 39, a first valve 711 that controls opening and closing of the intake duct 71, and a second valve 761 that controls opening and closing of the outside-air duct 76. The first valve 711 and the second valve 761 may be configured to open or close the corresponding ducts 71 and 76, respectively, under control of the control unit 781.

The moisture supply unit 8 included in the laundry treating apparatus according to the present disclosure may be configured to supply heated water vapor (steam) to the first chamber, and may be configured to supply unheated water vapor (mist) to the first chamber. FIG. 3 shows an example where the moisture supply unit 8 is configured to supply steam generated by heating the water to the first chamber.

That is, the moisture supply unit 8 may include a steam generator 81 that is disposed in the second chamber 39 to generate steam, a steam sprayer 84 that discharges the steam supplied from the steam generator to the first chamber 29, and a water supply unit 86 to supply water to the steam generator.

The steam generator 81 may include a water storage 811 that provides a space for storing water therein, and a heater 813 configured to heat the water inside the water storage 811. The water storage 811 has a water inlet 811a through which water flows into the storage 811 and a steam discharge hole 811b that discharges steam inside the water storage 811. The water storage 811 may be fixed to the receiving-portion body 78, and may be fixed to the connection duct 74.

The steam sprayer 84 may include a spray body 841 having one end fixed to the bottom surface 297 of the first chamber, and the other end fixed to a top surface of the second chamber 39, a supply pipe 843 to supply steam into the spray body 841, and a spray hole 847 that discharges steam in the spray body 841 into the first chamber 29. In this case, the supply pipe 843 may be connected to the steam discharge hole 811b via a connection pipe 845.

When the circulation duct is detachably disposed in through-holes (holes communicating with the first chamber) defined in the top surface of the second chamber 39, and when the connection pipe 845 is sufficiently long, the user will be able to extend the receiving-portion body 78 from the second chamber 39 to withdraw the air supply unit 7 and the moisture supply unit 8 out of the second chamber.

The water supply unit 86 may be configured to include a water supply tank 861 disposed outside the second chamber 39, and a supply pump 869 that supplies water stored inside the water supply tank 861 to the water storage 811.

The water supply tank 861 may be removably disposed on a front surface of the cabinet 1. In this case, the water supply tank 861 may have a water supply tank through-hole passing through the water supply tank and a check valve 867 for opening and closing the water supply tank through-hole. The water supply unit 86 may be configured to include a first supply pipe 869a inserted into the water supply tank through-hole, a second supply pipe 869b connected to the water inlet 811a, and a supply pump 869 to move water flowing into the first supply pipe 869a to the second supply pipe 869b.

The check valve 867 is configured to open the water supply tank through-hole only when the first supply pipe 869a is inserted into the water supply tank through-hole. Thus, when the water supply tank 861 is coupled to the front surface of the cabinet, the control unit 781 will be able to supply water to the water storage 811 through the supply pump 869.

A water supply hole 863 is defined in one surface of the water supply tank 861. FIG. 3 shows an example where the water supply hole 863 is defined in a top surface of the water supply tank. The water supply hole 863 may be opened and closed by a lid 865 that is detachably disposed on the water supply tank.

As shown in FIG. 1, the first chamber 29 may receive a laundry support to support laundry. The laundry support may be configured to include at least one of a first support 6a and a second support 6b.

The first support 6a may include a support plate detachably coupled to the second chamber 29, and a support plate through-hole constructed to extend through the support plate. The second support 6b may include a support bar 66 on which a hook H2 of a hanger H1 is detachably supported, a first connector 62 and a second connector 64 for connecting both ends of the support bar 66 to a top surface of the first chamber 29, respectively, and a driving unit 67, 68, and 69 to move the support bar 66 along a width direction (X-axis direction) of the first chamber 29.

Figure 4:
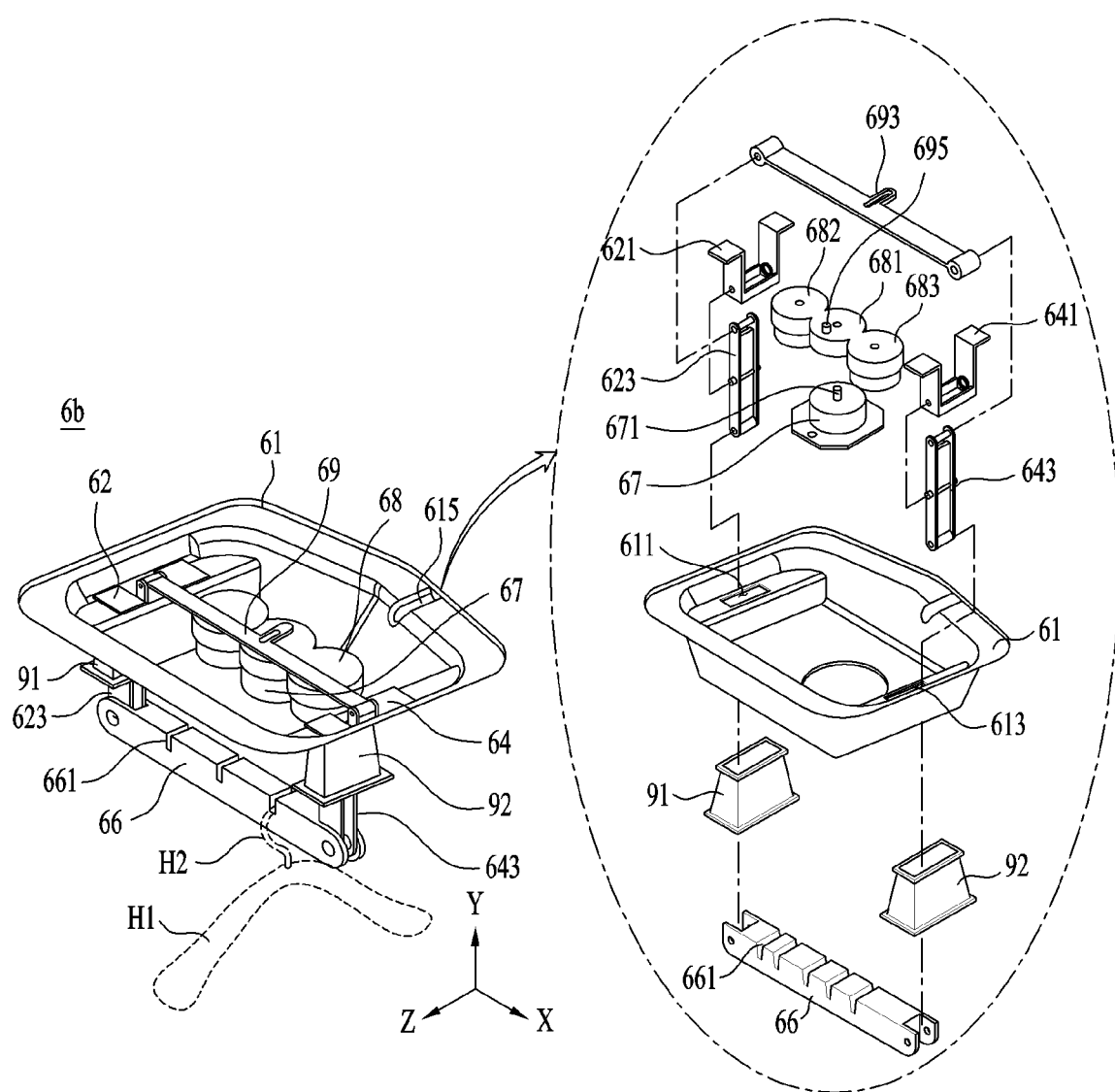
FIG. 4 and FIG. 5 show one example of a laundry support included in a laundry treating apparatus according to the present disclosure.

As shown in FIG. 2, the second support 6b may be fixed to a support frame 61 that is disposed fixedly between the top surface of the cabinet 1 and the top surface of the first chamber 29. As shown in FIG. 4, the support frame 61 may have a first support frame through-hole 611 and a second support frame through-hole 613 spaced apart from each other along a width direction (X-axis direction) of the first chamber. In this case, the first connector 62 is installed in the first support frame through-hole 611. The second connector 64 is installed in the second support frame through-hole 613. That is, the first connector 62 may be embodied as a first connection bar 623 inserted into the first support frame through-hole 611 and fixed to the support frame 61. The second connector 64 may be embodied as a second connection bar 643 inserted into the second support frame through-hole 613 and fixed to the support frame 61.

The first connection bar 623 may be rotatably coupled to a first fixed portion 621 fixed to the first support frame through-hole 611. The second connection bar 643 may be rotatably coupled to a second fixed portion 641 fixed to the second support frame through-hole 613.

In order that a bottom of the first connection bar 623 is disposed inside the first chamber 29, and a top of the first connection bar 623 is disposed above the support frame 61, the first fixed portion 621 may have a column shape with open top and bottom surfaces.

Similarly, in order that a bottom of the second connection bar 643 is disposed inside the first chamber 29, and a top of the second connection bar 643 is positioned above the support frame 61, the second fixed portion 641 may have a column shape with open top and bottom surfaces.

The support bar 66 may have one end fixed to a bottom of the first connection bar 623, and the other end fixed to a bottom of the second connection bar 643. The support bar 66 may have a hanger groove 661 defined therein in which a hook H2 of the hanger is detachably accommodated.

The driving unit 67, 68, and 69 may be configured to include a motor 67 fixed to the support frame 61, a vibrator 68 that performs alternately and repeatedly less than 90 degrees clockwise rotation and less than 90 degrees counterclockwise rotation via the motor 67, and a power transmission 69 that converts a rotation motion of the vibrator 68 into a reciprocating motion of the support bar.

The vibrator 68 includes a first casing 681 disposed above the motor 67, and a second casing 682 and a third casing 683 disposed on opposite sides of the first casing 681, respectively, and fixed to the first casing 681. As shown in (a) in FIG. 5, the first casing 681 receives therein a driving gear 684a rotated by a rotation shaft 671 of the motor, and a first driven gear 684b and a second driven gear 684c respectively disposed on opposite sides of the driving gear.

A first vibration body is disposed inside the second casing 682. A second vibration body is disposed inside the third casing 683.

The first vibration body may be configured to include a first gear 685 that is disposed inside the second casing 682 and is rotated by the first driven gear 684b, and a first weight 686 fixed to the first gear 685. Likewise, the second vibration body may be configured to include a second gear 687 that is disposed inside the third casing 683 and is rotated by the second driven gear 684c, and a second weight 688 fixed to the second gear 687. The first weight 686 may refer to means for positioning a center of gravity of the first gear 685 at a position between a center of rotation of the first gear 685 and an edge of the first gear. The second weight 688 may refer to means for positioning a center of gravity of the second gear 687 at a position between a center of rotation of the second gear 687 and an edge of the second gear.

Figure 5:
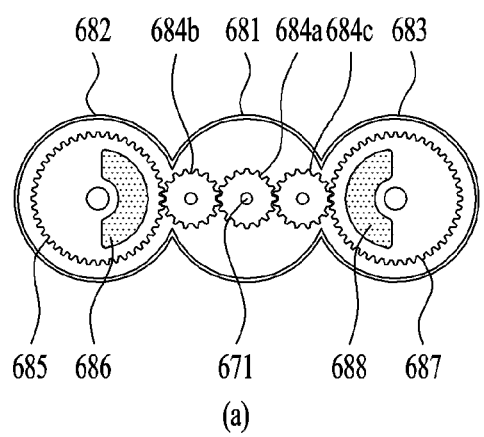
Figure 5:
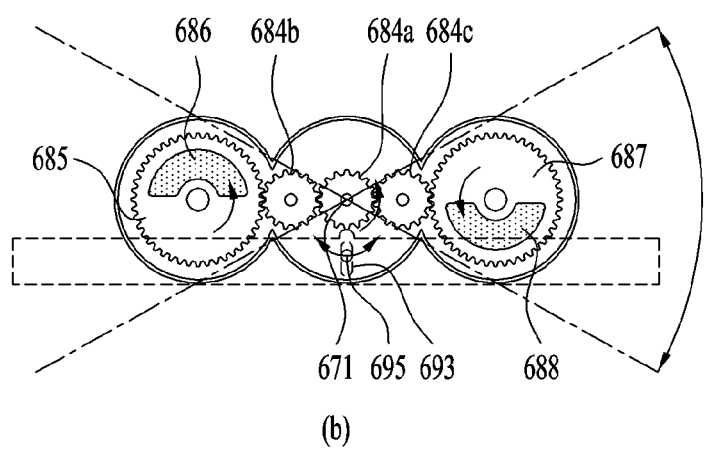

FIG. 5 shows an example where each of the first weight 686 and the second weight 688 has a semicircular shape. In this case, the first weight 686 and the second weight 688 should be arranged to be spaced apart from each other by 180 degrees. That is, when the first weight 686 may be fixed to the first gear 685 so as to surface toward a +X axis, while the second weight 688 may be fixed to the second gear 687 so as to surface toward a −X axis.

The power transmission 69 may include a transmission bar 691 disposed above the first casing 681 of the vibrator and connecting the first connection bar 623 and the second connection bar 643 to each other, a slot 693 defined in the transmission bar 691, and a slot protrusion 695 protruding from the first casing 681 and inserted in the slot 693. The slot 693 may extend along a Z-axis direction orthogonal to a movement direction of the support bar 66. A length of the slot 693 may be set to be equal to a displacement in the Z-axis direction of the slot protrusion 695, or may be set to be larger than the displacement in the Z-axis direction of the slot protrusion 695.

As shown in (b) in FIG. 5, in the second support 6b with the above-described structure, when the rotation shaft 671 of the motor rotates counterclockwise, the first weight 686 and the second weight 688 are also rotated counterclockwise via the gears 684a, 684b, 684c, 685, and 687. The first weight 686 and the second weight 688 are always oriented to surface toward opposite directions. Thus, when the driving gear 684a rotates, the first casing 681 repeats alternately a less than 90 degrees clockwise rotation and a less than 90 degrees counterclockwise rotation. When the first casing 681 repeats alternately the less than 90 degrees clockwise rotation and the less than 90 degrees counterclockwise rotation, the slot protrusion 695 protruding from the first casing may reciprocate along a arc.

In one example, the length of the slot 693 is set to be larger than the Z-axis displacement of the slot protrusion 695, the transmission bar 691 will reciprocate along the X-axis direction orthogonal to a longitudinal direction of the slot 693. Because the support bar 66 disposed inside the first chamber 29 is connected to the transmission bar 691 via the first connection bar 623 and second connection bar 643, the support bar 66 will reciprocate along a width direction of the first chamber. Thus, the apparatus according to the present disclosure may shake the laundry inside the first chamber 29, and thus, dirt on the laundry may be separated from the laundry. Further, when moisture is supplied to the first chamber 29 while shaking the laundry, wrinkles on the laundry may be removed more effectively.

Figure 6:
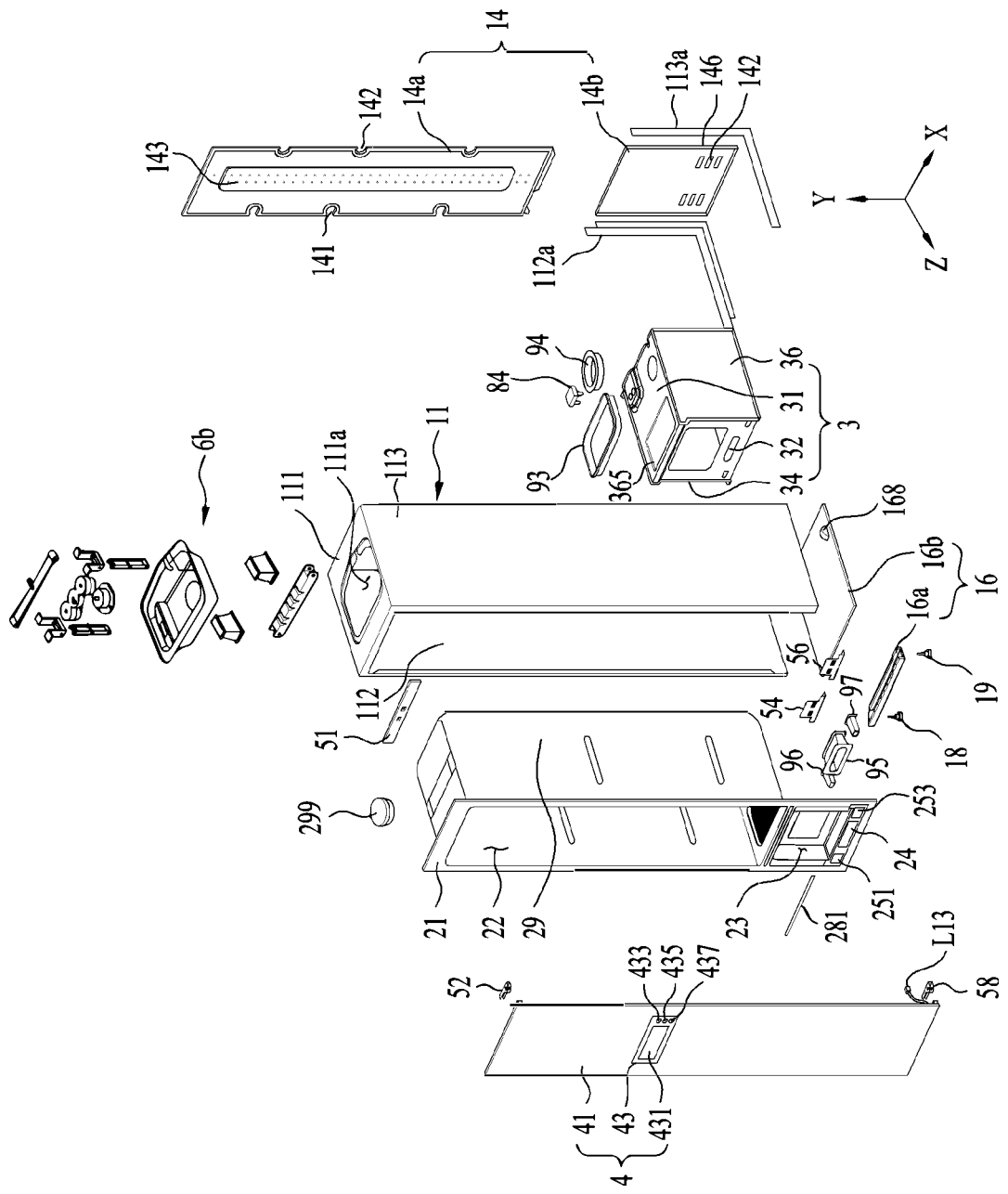
FIG. 6 shows one example of each of a cabinet, a first chamber defining structure, and a second chamber defining structure included in a laundry treating apparatus according to the present disclosure.

As shown in FIG. 6, the cabinet 1 includes a cabinet body 11 defining top surface and both side surfaces. The cabinet body 11 includes a top panel 111 defining a top surface of the laundry treating apparatus 100, and a first side panel 112 and a second side panel 113 respectively defining left and right sides of the laundry treating apparatus. The top panel 111, the first side panel 112 and the second side panel 113 may be integrated with each other or may be assembled with each other to define a single cabinet body 11. FIG. 6 illustrates one example where the top panel, the first side panel, and the second side panel are integrated with each other.

The cabinet 1 includes a bottom panel 16 which defines a bottom surface of the laundry treating apparatus 100 and which is coupled to the cabinet body 11, and a rear panel 14 which defines a rear surface of the laundry treating apparatus 100 and is coupled to the cabinet body 11.

The cabinet 1 receives therein a first chamber defining structure 2 defining the first chamber 29 and a second chamber defining structure 3 defining the second chamber 39.

The first chamber defining structure 2 includes a first base 21 fixed to the cabinet 1 and positioned on a front surface of the cabinet, a laundry inlet 22 extending through the first base and communicating with the second chamber 29, a tank receiving portion 23 disposed below the laundry inlet to provide a space to accommodate therein the drainage tank 791 and the water supply tank 861, and a first outside-air intake hole 24 defined below the tank receiving portion and connected to the outside-air duct 76.

The second chamber defining structure 3 may include a second base 31, 32, and 34 and 36 defining the second chamber 39 under the first chamber 29. In other words, the second base may include a front frame 32 disposed between the first base 21 and the rear panel 14, a top frame 31 extending from the front frame 32 toward the panel 14 and spaced from a bottom surface of the first chamber 29, a first side frame 34 fixed to the two frames 31 and 32 and spaced apart from the first side panel 112, and a second side frame 36 fixed to the two frames 31 and 32 and spaced apart from the second side panel 113. In this case, the second chamber 39 will be defined by the front frame 32, the top frame 31, the first side frame 34, the second side frame 34, the bottom panel 16, and the rear panel 14.

The rear panel 14 may include a first rear panel 14a that defines an upper rear surface of the cabinet, and a second rear panel 14b that is disposed under the first rear panel and defines a lower rear surface of the cabinet. The first rear panel 14a may be constructed to be disposed in rear of the first chamber 29. The second rear panel 14b may be constructed to define a rear surface of the second chamber 39.

The bottom panel 16 may be configured to include a first bottom panel 16a on which legs 18 and 19 are supported, and a second bottom panel 16b connected to the first bottom panel 16a.

The first bottom panel 16a may have a front surface fixed to the first base 21, a rear surface fixed to the front frame 32 of the second base, and both side surfaces respectively fixed to a bottom of the first side panel 112 and a bottom of the second side panel 113. Thus, the first bottom panel 16a may maintain a spacing between the front panel 211 and the front frame 32.

The second bottom panel 16b may be disposed below the second base 31, 32, 34, and 36, and may have a front surface connected to a rear surface of the first bottom panel 16a, and both side surfaces fixed to a bottom surface of the first side frame 34 and a bottom surface of the second side frame, respectively. However, both side surfaces of the second bottom panel 16b may be configured to be fixed to the first side panel 112 and the second side panel 113, respectively.

A first leg 18 and a second leg 19 installed on a bottom surface of an indoor room for supporting the laundry treating apparatus 100 are fixed to the first bottom panel 16a. Rollers 168 that facilitate movement of the laundry treating apparatus may be disposed on the second bottom panel 16b. In this case, the second chamber 39 will be defined by the front frame 32, the top frame 31, the first side frame 34, the second side frame 34, the second bottom panel 16b, and the second rear panel 14b.

The first leg 18 and the second leg 19 may be embodied as a structure capable of adjusting a spacing between a bottom surface of an installation space where the laundry treating apparatus is installed and the first bottom panel 16a. A communication hole 142 may be defined in the rear panel 14b to communicate an inside of the second chamber 39 with an outside thereof.

Figure 7:
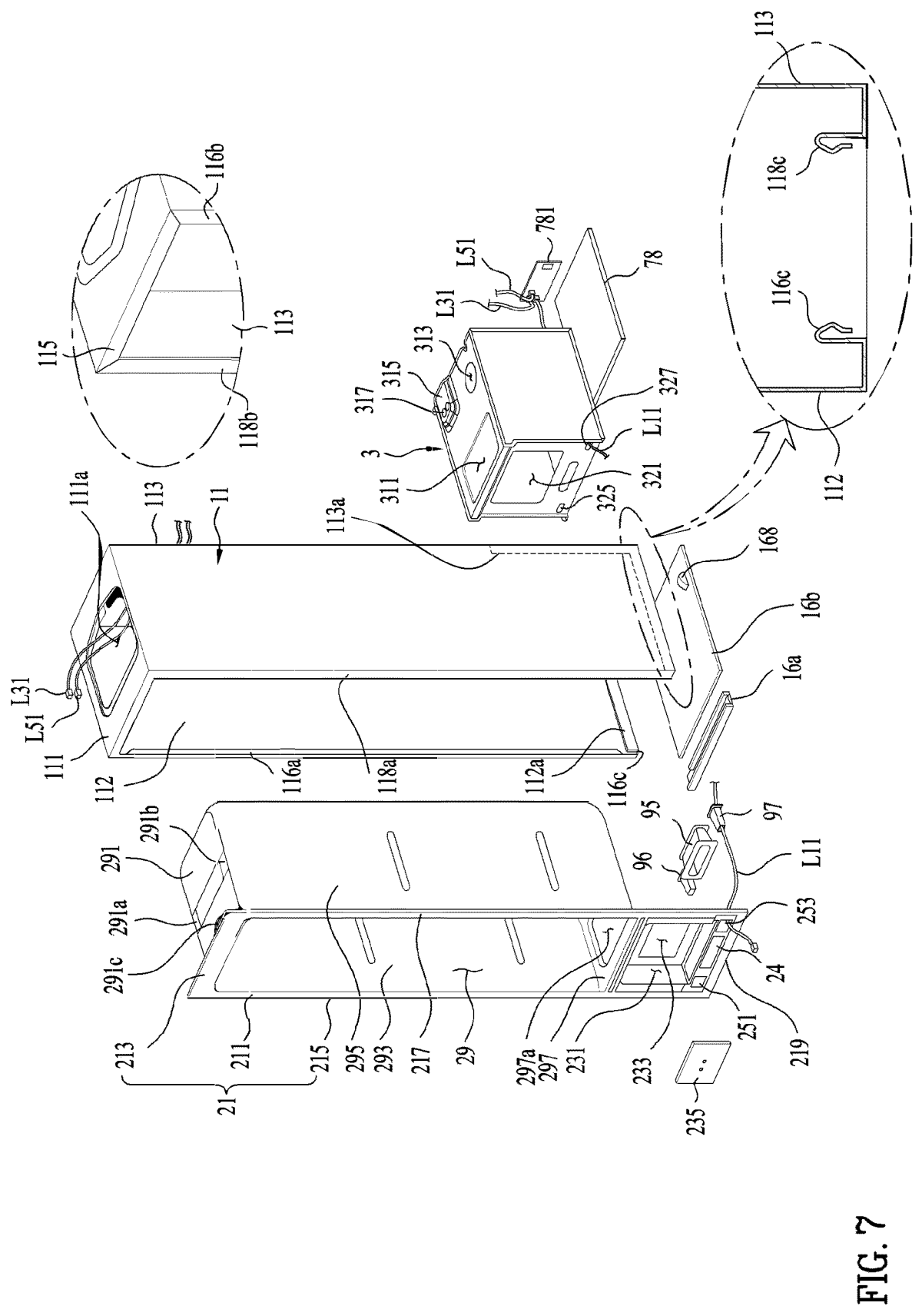

As shown in FIG. 7, a front top-panel fastener 114, a first front fastener 116a, and second front fastener 118a may be disposed in front of the top panel 111, in front of the first side panel 112, and in front of the second side panel 113, respectively. A top of the first base 21, and both sides thereof may be coupled to the cabinet 1 via the front top-panel fastener 114, the first front fastener 116a, and the second front fastener 118a, respectively.

Figure 8:
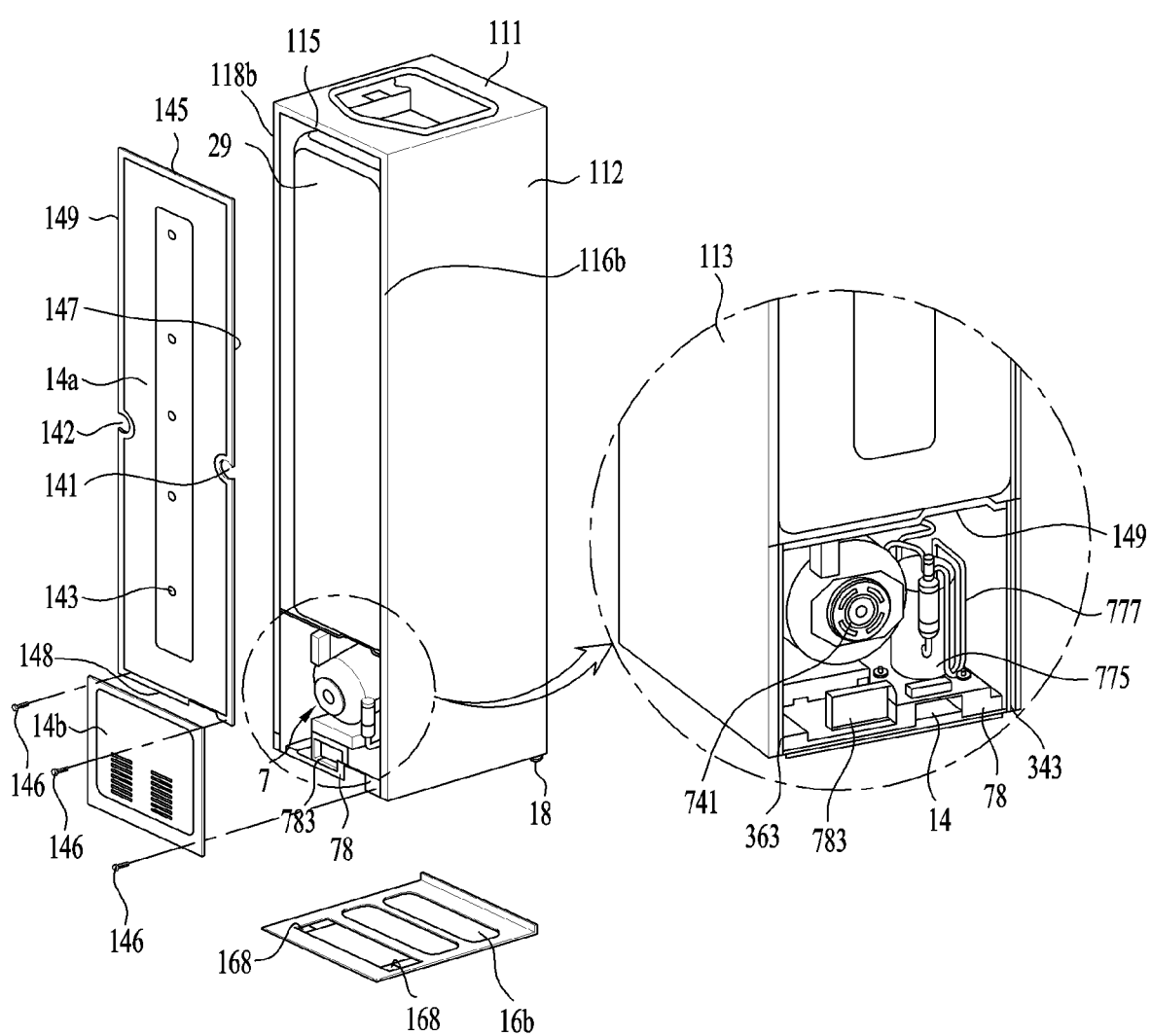

A rear top-panel fastener 115, a first rear fastener 116b, and a second rear fastener 118b may be disposed in rear of the top panel 111, in rear of the first side panel 112, and in rear of the second side panel 113, respectively. As shown in FIG. 8, the first rear panel 14a has a top rear-panel fastener 145 coupling to the rear top-panel fastener 115, a first rear-panel fastener 147 coupling to the first rear fastener 116b, and a second rear-panel fastener 149 coupling to the second rear fastener 118b. In one example, a bottom of the first rear panel 14a is fixed to a rear surface of the top frame 31 constituting the second chamber defining structure via a bottom rear-panel fastener 148.

In one example, rear surfaces 343 and 363 of the second base 31, 32, 33, and 34 may be fixed to the cabinet 1 via the first rear fastener 116b, and the second rear fastener 118b. The second rear panel 14b may be removably coupled to the rear surfaces 343 and 363 of the second base via a base fastener 146. One example of the base fastener 146 may be a bolt that secures the second rear panel 14b to the rear surfaces 343 and 363 of the second base.

Figure 9:
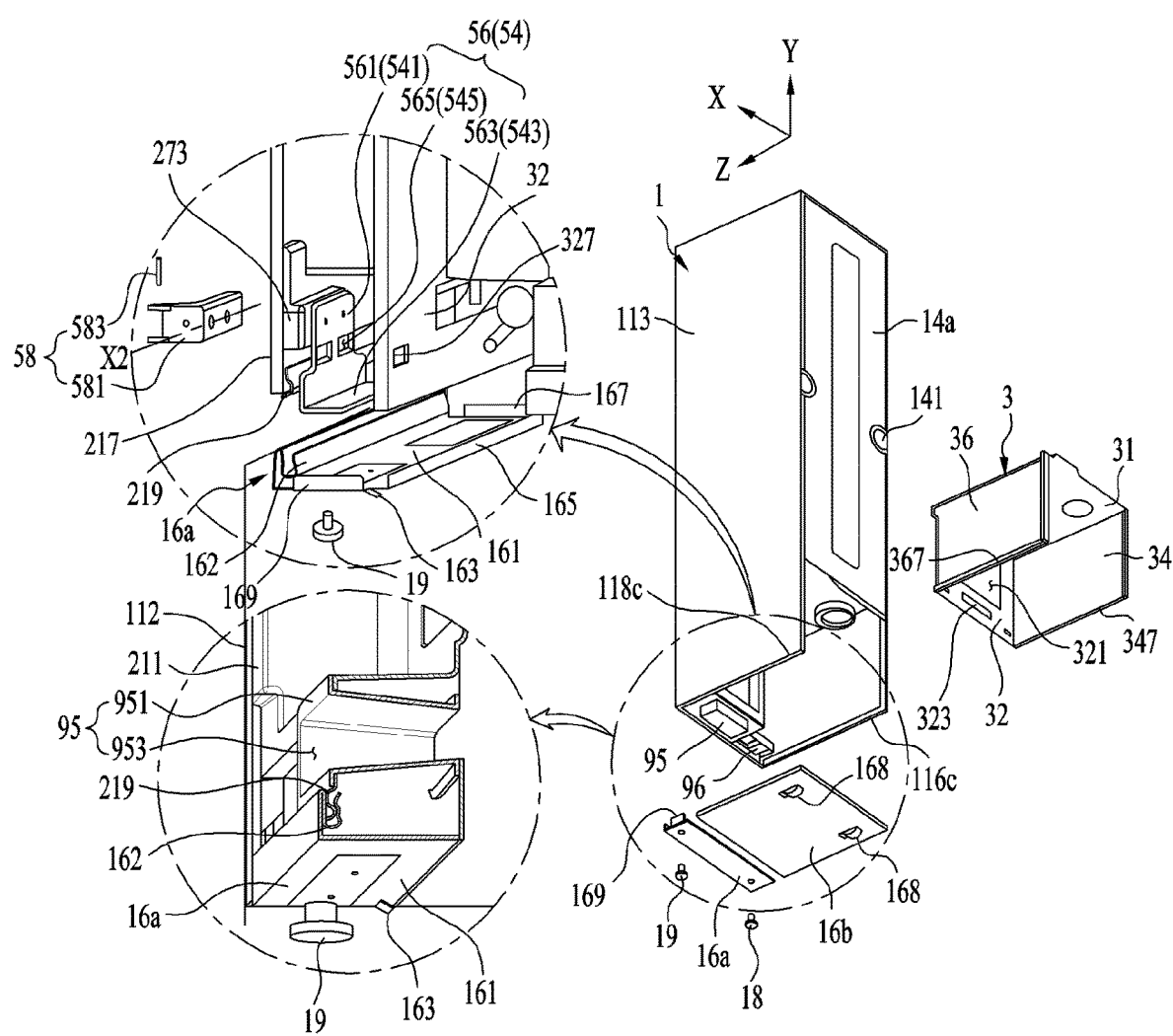

As shown in FIG. 9, a first bottom fastener 116c and a second bottom fastener 118c may be disposed on a bottom of the first side panel 112 and a bottom of the second side panel 113, respectively. Bottom surfaces 347 and 367 of the first bottom panel 16a and the second base may be secured to the cabinet via the first bottom fastener 116c and second bottom fastener 118c, respectively.

That is, the first bottom panel 16a includes a panel body 161, a front bottom-panel fastener 162 disposed on a front surface of the panel body 161 and coupled to a bottom of the first base 21, a front frame fastener 165 which is disposed on a rear surface of the panel body 161 and fixed to the front frame 32 of the second chamber defining structure, a first bottom-panel fastener 167 disposed on one side surface of the panel body 161 and coupling to the first bottom fastener 116c, and a second bottom-panel fastener 169 disposed on an opposite side surface of the panel body 161 and coupling to the second bottom fastener 118c.

One end of the second bottom panel 16b may be connected to a panel connector 163 disposed on the panel body 161. The panel connector 163 may include a protruding plate protruding from a bottom surface of the panel body 161 and providing a space for receiving therein a front end of the second bottom panel 16b.

Figure 10:
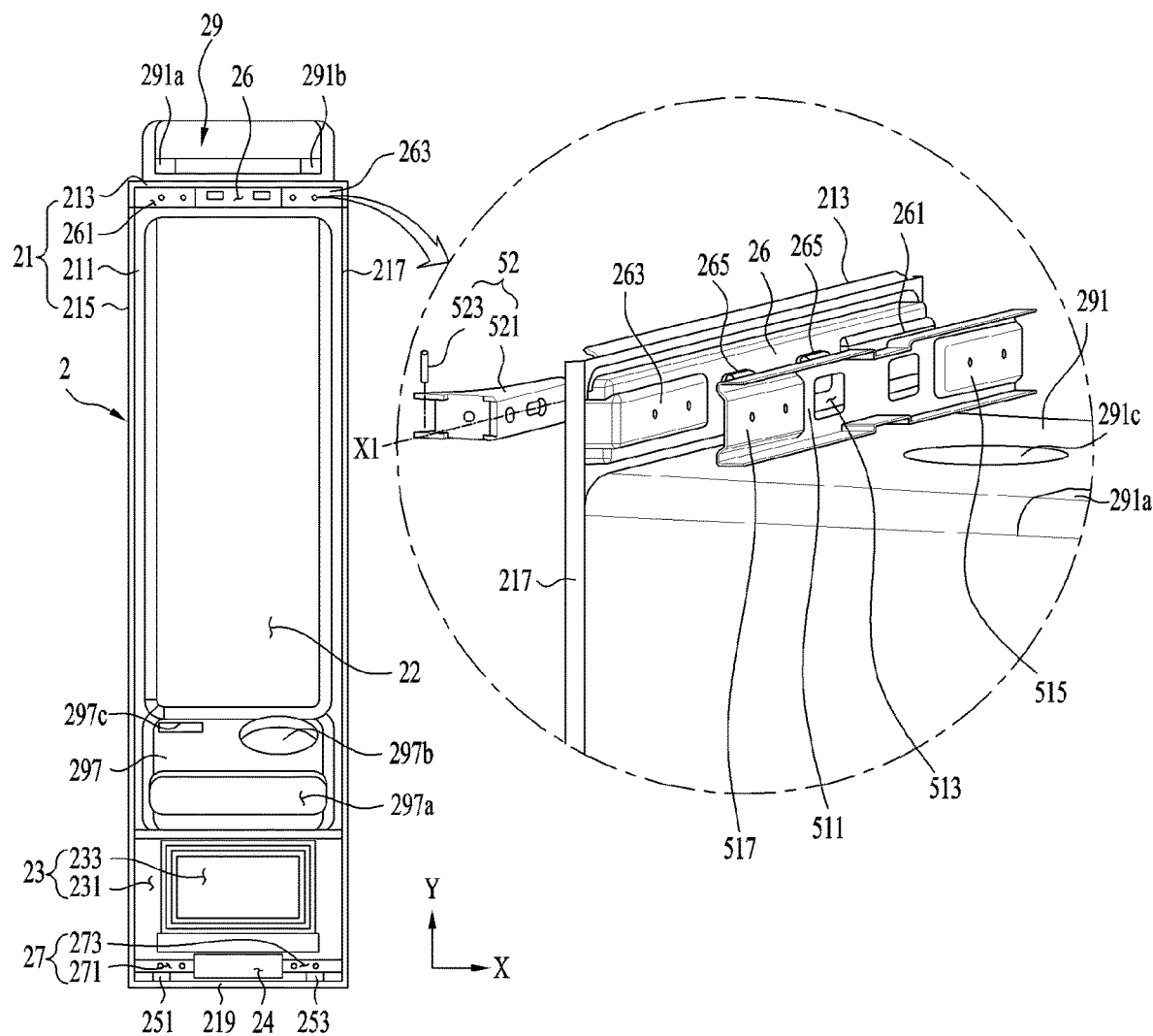
FIG. 10, FIG. 11, and FIG. 12 show one example of a first chamber defining structure.

As shown in FIG. 10, the first chamber defining structure 2 includes the first base 21 which is fixed to the cabinet 1 and disposed in front of the cabinet, the second chamber 29 which is fixed to the first base and provides a space to accommodate therein laundry, the laundry inlet 22 which extends through the first base and communicates with the second chamber 29, and the tank receiving portion 23 disposed on the first base and disposed below the laundry inlet, and the first outside-air intake hole 24 defined below the tank receiving portion 23 and communicating with the outside-air duct 76

The first base 21 may include the front panel 211 defining the front surface of the cabinet 1, and a top front-panel fastener 213, a first front-panel fastener 215, a second front-panel fastener 217 and a bottom front-panel fastener 219 which are arranged along an edge of the front panel.

The top front-panel fastener 213 is coupled to the front top-panel fastener 114. The first front-panel fastener 215 is coupled to the first front fastener 116a of the cabinet. The second front-panel fastener 217 is coupled to the second front fastener 118a of the cabinet. The bottom front-panel fastener 219 is coupled to the front bottom-panel fastener 162.

The laundry inlet 22 may be embodied as a through-hole passing through the front panel 211. As shown in FIG. 7, the second chamber 29 may include a chamber top surface 291 that is fixed to the front panel 211 and disposed at a top of the laundry inlet 22, a chamber bottom surface 297 which is fixed to the front panel 211 and disposed at a bottom of the laundry inlet 22, a first chamber side surface 293 and a second chamber side surface 295 which are fixed to the front panel 211 and connect the chamber top surface and chamber bottom surface to each other, and a chamber rear surface 298 fixed to the four surfaces 291, 293, 295, and 297.

The chamber top surface 291 may have a first bar through-hole 291a into which the first connection bar 623 of the second support 6b is inserted, and a second bar through-hole 291b into which the second connection bar 643 thereof is inserted. Further, the chamber top surface 291 may have a lamp insertion hole 291c through which a lamp 299 configured to illuminate the inside of the first chamber 29 is inserted.

As shown in FIG. 10, the chamber bottom surface 297 may have a first chamber through-hole 297a, a second chamber through-hole 297b, and a third chamber through-hole 297c.

The first chamber through-hole 297a may refer to means for supplying the air inside the first chamber 29 to the intake duct 71 disposed in the second chamber 39. The second chamber through-hole 297b may refer to means of introducing air discharged from the discharge duct 72 disposed in the second chamber 39 into the first chamber 29. The third chamber through-hole 297c may refer to a space where a top surface of the spray body 841 is fixedly disposed. Steam exiting the spray hole 847 may be supplied to the first chamber 29 through the third chamber through-hole 297c.

The tank receiving portion 23 disposed under the laundry inlet 22 may include a receiving groove 231 embodied as a groove defined concavely into a surface of the front panel 211 toward the second chamber defining structure 3. The receiving groove 231 provides a space in which the drainage tank 761 and the water supply tank 861 are removably accommodated.

The receiving groove 231 may include a second chamber communication hole 233 constructed to communicate with the second chamber 39. The first discharge pipe 799a of the air supply unit and the first supply pipe 869a of the moisture supply unit may be respectively coupled to the tanks 791 and 861 through the second chamber communication hole 233.

As shown in FIG. 7, the second chamber communication hole 233 may be opened and closed by a communication hole cover 235 that is detachably coupled to the front panel 211. In this case, the first discharge pipe 799a and the first supply pipe 869a should be constructed to extend through the communication hole cover 235.

The laundry inlet 22 and the tank receiving portion 23 may be configured to be opened and closed by a door 4 rotatably coupled to at least one of the first base 21 or the cabinet 1.

As shown in FIG. 6, the door 4 is configured to open or close the laundry inlet 22 and the tank receiving portion 23 at the same time. To this end, the door 4 may include a door body 41 embodied as a structure of a shape corresponding to a shape of the front surface of the cabinet 1. The door body 41 may be rotatably fixed to the cabinet 1 or the first base 21 via a first hinge 52 and a second hinge 58.

FIG. 6 shows one example where the first hinge 52 and the second hinge 58 secure the door body 41 to the first base 21. In this case, the first hinge 52 may be disposed at a top of the laundry inlet 22, while the second hinge 58 may be disposed at a bottom of the tank receiving portion 23.

The door 4 may further include a control panel 43 that is fixed to the door body 41. The control panel 43 may include an input interface 433, 435, and 437 for receiving a control command from a user, and a display 431 displaying a control command selectable by the user and an execution process of a control command selected by the user. The input interface may include a first input interface 433 that allows the user to instruct supply of power to the laundry treating apparatus 100, a second input interface 435 that receives a control command from the user, and a third input interface 437 that receives an initiation command of the control command selected via the second input interface.

As shown in FIG. 6 and FIG. 7, the control panel 43 is connected to the control unit 781 installed in the second chamber 39 via a first wire. The first wire may include a control panel connection wire L13 connected to the control panel 43, and a first control wire L11 connecting the control unit 781 and the control panel connection wire L13 to each other. To ensure ease of assembly, the control panel connection wire L13 and the first control wire L11 may be attachable to or detachable from each other.

As shown in FIG. 6, the first hinge 52 and the second hinge 58 may be disposed on a right top and a right bottom of the front panel 211, respectively, so that the door body 41 may be configured to rotate via the rotation shaft disposed on a right side of the front panel. Alternatively, the first hinge 52 and the second hinge 58 may be disposed on a left top and a left bottom of the front panel 211, respectively, so that the door body 41 may be configured to rotate via the rotation shaft disposed on a left side of the front panel.

To this end, as shown in FIG. 10, the front panel 211 may include a first mounting portion 26 that provides a space in which the first hinge 52 is installed, and a second mounting portion 27 that provides a space in which the second hinge 58 is installed.

The first mounting portion 26 may include a groove defined concavely into the front panel 221 disposed above the laundry inlet 22 toward the rear panel 14. The second mounting portion 27 may include a groove defined concavely into the front panel 221 positioned under the receiving groove 231 toward the rear panel 14.

A first first-hinge mounting portion 261 may be disposed on a left side of the first mounting portion 26. A second first-hinge mounting portion 263 may be disposed on a right of the first mounting portion 26. The first hinge 52 may be configured to include a first hinge body 521 fixed to the first mounting portion 26, and a rotation shaft 523 coupling the door body to the first hinge body 521. The first hinge body 521 is symmetrical with respect to a horizontal line (a straight line X1 parallel to the X-axis) passing through a center of the first hinge. This is intended to ensure that the first hinge body 521 may be fixed to any one of the first first-hinge mounting portion 261 and the second first-hinge mounting portion 263.

A first second-hinge mounting portion 271 is disposed on a left side of the second mounting portion 27. A second second-hinge mounting portion 273 is disposed on a right side of the second mounting portion 27. As shown in FIG. 9, the second hinge 58 may be configured to include a second hinge body 581 that is fixed to the second mounting portion 27, and a rotation shaft 583 that couples the door body to the second hinge body 581. The second hinge body 583 is also preferably embodied to have a symmetrical shape with respect to a horizontal line X2 passing through a center of the second hinge.

According to the present disclosure, the first hinge 52 is fixedly disposed in a top space of the front panel 211. Thus, as a load on the door body 41 increases, risk of damage to the front panel 211 increases. Thus, to prevent the damage to the front panel 211 due to the load of the door body 41, the apparatus according to the present disclosure may further include a first hinge bracket 51 supporting the first hinge and a second hinge bracket 54 and 56 supporting the second hinge.

The first hinge bracket 51 may include a bracket body 511 that is fixed to the front panel 211 and disposed inside the cabinet 1, first receiving portions 515 that is disposed on the bracket body to provide a space to accommodate therein the first first-hinge mounting portion 261, and second receiving portions 517 disposed on the bracket body to provide a space for accommodating therein the second first-hinge mounting portion 263.

Each of the first receiving portions 515 and the second receiving portions 517 may include or may be embodied as a groove defined concavely in a surface of the bracket body 511 in a direction away from the first mounting portion 26.

The bracket body 511 may be secured to the first mounting portion 26 via a first hinge fixing bolt (not shown) that secures the first hinge 52 to the first mounting portion 26. That is, the first hinge fixing bolt extends through the first hinge 52 and the first mounting portion 26 and is fixed to the bracket body 511.

To facilitate coupling between the bracket body 511 and the first mounting portion 26, a first position-fixing portion 265 may be disposed on the first mounting portion 26, and a second position-fixing portion 513 fastened to the first position-fixing portion 265 may be disposed on the bracket body 511.

In one example, the first position-fixing portion 265 may be embodied as a protrusion protruding from the first mounting portion 26 toward the bracket body 511, while the second position-fixing portion 513 may be embodied as a through-hole defined in the bracket body 511 and into which the first position-fixing portion is inserted.

As shown in FIG. 9, the second hinge bracket 54 and 56 may include a first second-hinge bracket 54 connecting the first second-hinge mounting portion 271 and the first bottom panel 16a to each other, and a second second-hinge bracket 56a connecting the second second-hinge mounting portion 273 and the first bottom panel 16a to each other.

The second second-hinge bracket 56 may be configured to include a second front-panel fixing plate 561 which is fixed to the front panel 211 and disposed between the second second-hinge mounting portion 273 and the front frame 32, and a second bottom-panel fixing plate 563 connecting the panel body 161 to the second front-panel fixing plate 561 Likewise, the first second-hinge bracket 54 may be configured to include a first front-panel fixing plate 541 which is fixed to the front panel 211 and positioned between the first second-hinge mounting portion 271 and front frame 32, and a first bottom-panel fixing plate 543 connecting the first front-panel fixing plate 441 and the panel body 161 to each other. The second hinge 58 may be fixed to the first front-panel fixing plate 541 via a second hinge fixing bolt (not shown) or may be fixed to the second front-panel fixing plate 561 via a second hinge fixing bolt (not shown).

When the second hinge bracket is disposed, the first leg 18 may extend through the panel body 161 and may be fixed to the first bottom-panel fixing plate 543, while the second leg 19 may extend through the panel body 161 and be fixed to the second bottom-panel fixing plate 563.

Figure 11:
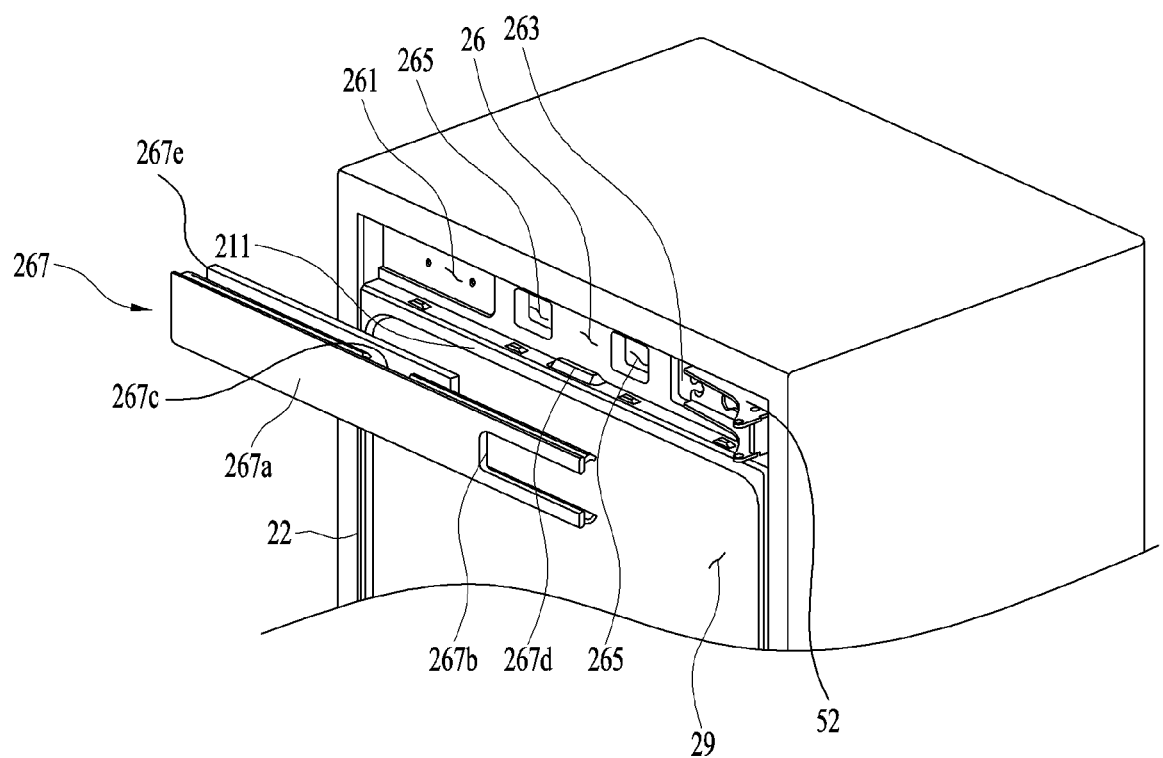

As shown in FIG. 11, the laundry treating apparatus according to the present disclosure 100 may further include a first receiving-portion cover 267 that is detachably coupled to the first mounting portion 26.

The first receiving-portion cover 267 may include a first cover body 267a which is detachably disposed on the first mounting portion 26 to prevent the first first-hinge mounting portion 261 and the second first-hinge mounting portion 263 from being exposed to an outside, and a first hinge through-hole 267b which extends through the first cover body 267a and into which the first hinge 52 is inserted.

Since the first hinge 52 may be fixed to any one of the first first-hinge mounting portion 261 and the second first-hinge mounting portion 263, each of the first cover body 267a and the first hinge through-hole 267b should be embodied to have a symmetrical shape with respect to a horizontal line passing through a center of the first cover body 267a and a center of the first hinge through-hole 267b.

The first cover body 267a may be secured to the first mounting portion 26 via a first cover fastener. The first cover fastener may include a fastening protrusion 267d disposed on one of the first mounting portion 26 and the first cover body 267a, and a fastening groove 267c which is defined in the other of the first mounting portion 26 and the first cover body 267a and into which the fastening protrusion is inserted. The fastening protrusion 267d may have a shape such that the protrusion 267d is press-fitted into the fastening groove 267c.

To removably couple the door body 41 to the first cover body 267a, the laundry treating apparatus according to the present disclosure 100 may further include a first cover magnet 267e disposed on the first receiving-portion cover 267, and a first door magnetic body 411 (see FIG. 1) disposed on the door body 41. The first cover body 267a may be embodied as a magnetic body made of a metal. The first door magnetic body 411 may include a permanent magnet or a metal as positioned in a region of the door body 41 onto which the first cover magnet 267e projects.

Figure 12:
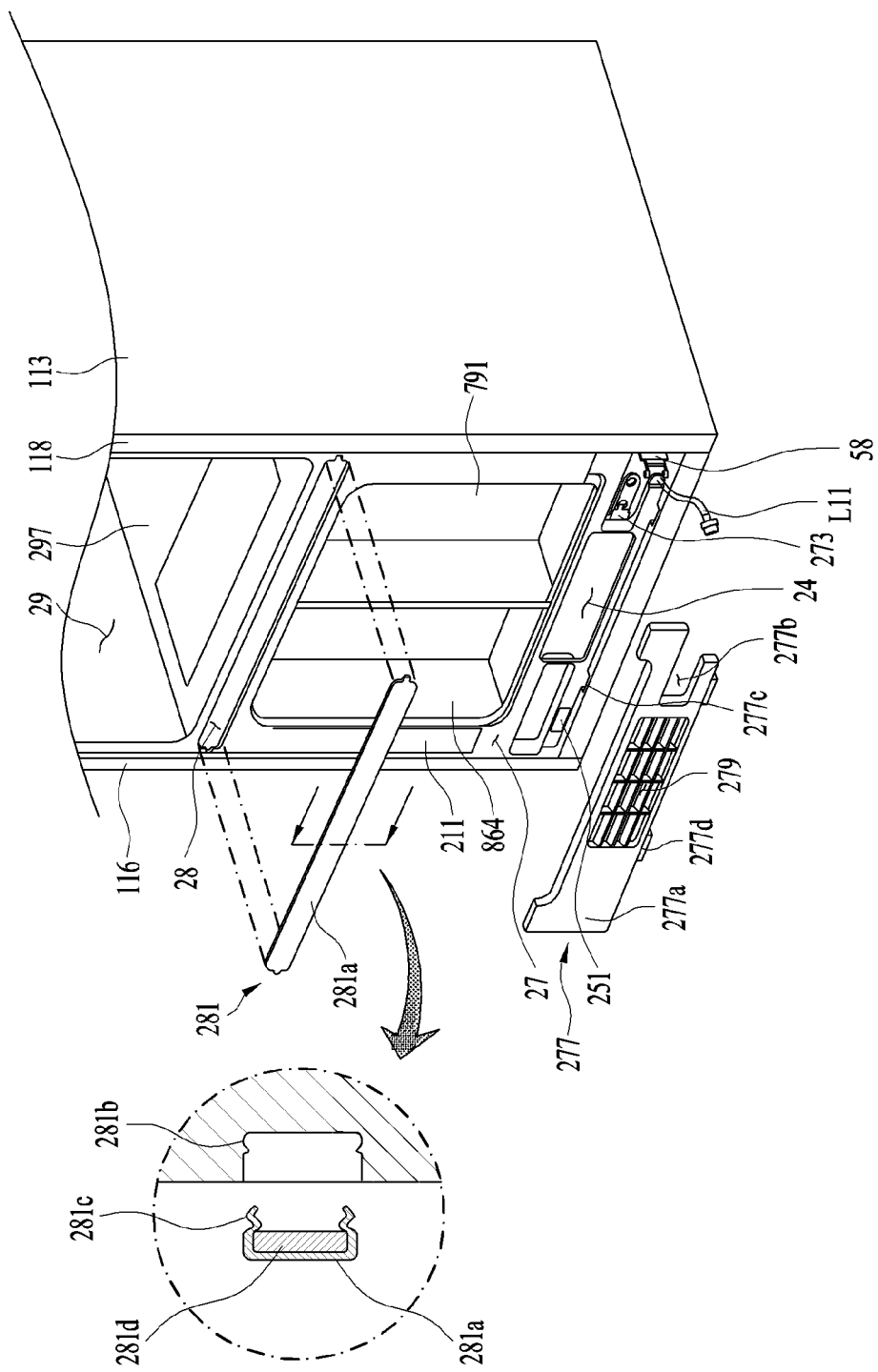

As shown in FIG. 12, the second receiving-portion cover 277 may be disposed on the second mounting portion 27. The second receiving-portion cover 277 may include a second cover body 277a which is detachably disposed on the second mounting portion 271 to prevent the first second-hinge mounting portion 271 and the second second-hinge mounting portion 273 from being exposed to the outside, and a second hinge through-hole 277b which extends through the second cover body 277a and into which the second hinge 58 is inserted.

The second cover body 277a may be secured to the second mounting portion 27 via a second cover fastener. The second cover fastener may include a fastening protrusion 277d disposed on one of the second mounting portion 27 and the second cover body 277a, and a fastening groove 277c defined in the other of the second mounting portion 27 and the second cover body 277a so that the fastening protrusion 277d is forcibly fitted into the groove 277c.

In one example, the second mounting portion 27 has an outside-air first intake hole 24 that supplies outside-air to the circulation duct. Thus, the second receiving-portion cover 277 must have a cover through-hole 279 that extends through the second cover body 277a and communicates with the first outside-air intake hole 24.

Although not shown in the drawing, each of the second cover body 277a and the second hinge through-hole 277b may have a symmetrical shape with respect to the horizontal line passing through a center of the second cover body 277a, a center of the cover through-hole 279, and a center of the second hinge through-hole 277b.

A third receiving portion 28, and a third receiving-portion cover 281 fixed to the third receiving portion 28 may be further disposed in a spaced defined by the front panel 211 and between the laundry inlet 22 and the tank receiving portion 23.

The third receiving portion 28 may be embodied as a groove defined concavely in the front panel 211. The third receiving-portion cover 281 may include a third cover body 281a that is forcibly fitted into the third receiving portion 28. That is, the third cover body 281a may be secured to the third receiving portion 28 via a third cover fastener embodied as a fastening protrusion 281c that is forcibly fitted into the fastening groove 281b. The fastening groove 281b may be defined in one of the third cover body 281a and the third receiving portion 28, and the fastening protrusion 281c may protrude on the other of the third cover body 281a and the third receiving portion 28.

To couple the door body 41 detachably to the third receiving-portion cover 281, an apparatus according to the present disclosure may further include a third cover magnet 281d fixed to the third cover body 281a, and a second door magnetic body 413 (see FIG. 1) disposed on the door body 41. The third cover body 281a may be embodied as a magnetic body made of metal. The second door magnetic body 413 may include a permanent magnet or a metal positioned in a region of the door body 41 onto the third cover magnet 281d is projected.

Figure 13:
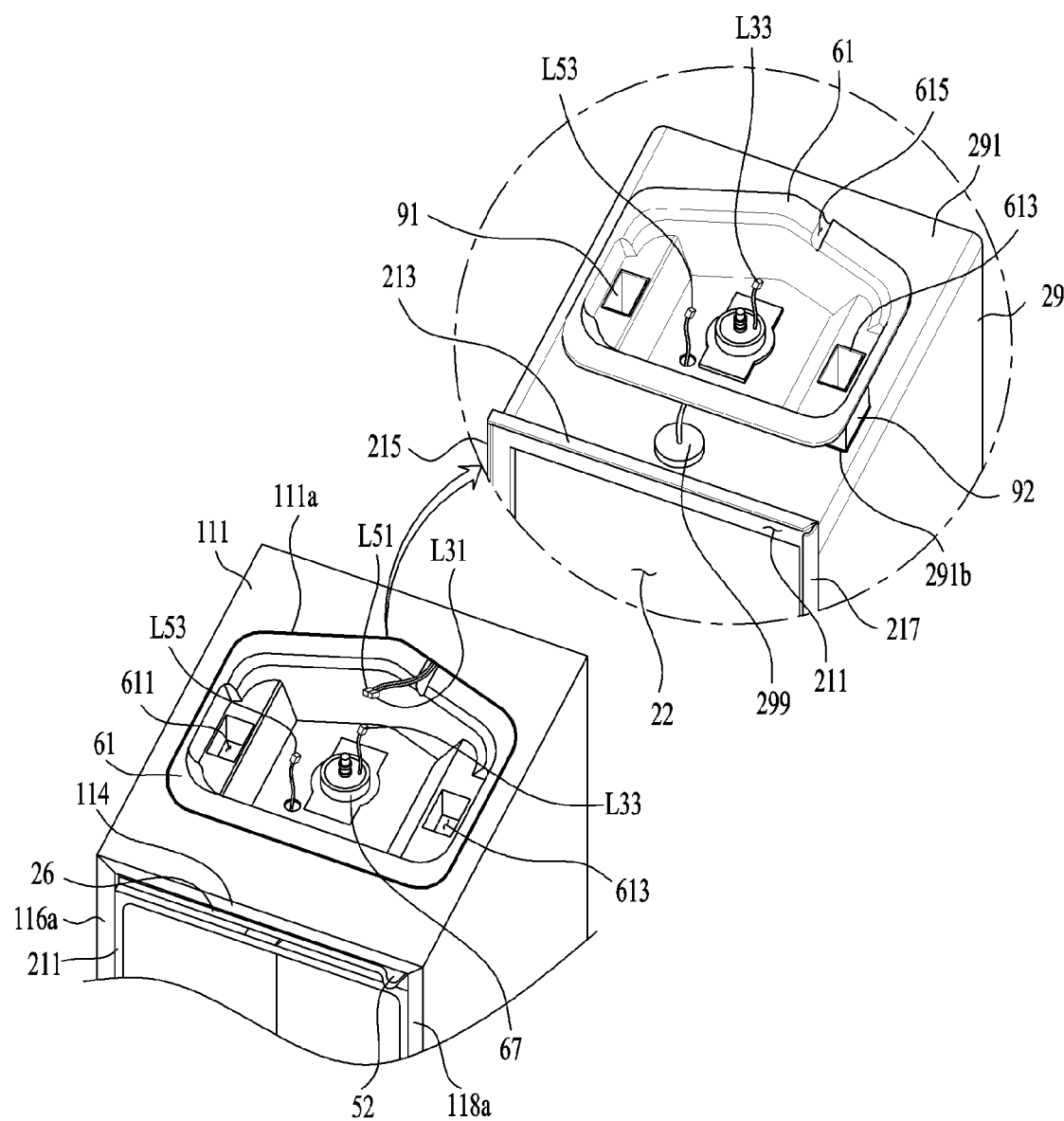
FIG. 13 shows one example of each of a support frame, a first support body, and a second support body included in a laundry treating apparatus according to the present disclosure.

As shown in FIG. 13, the support frame 61 may be fixed to the cabinet 1 via a through-hole 111a extending through the top panel 111, the first support body 91 and the second support body 92.

The through-hole 111a may have any shape as long as the hole 111a supports an edge of the support frame 61. The support frame 61 may be secured to the cabinet 1 via a fastener such as a bolt that extends through the support frame and is secured to the top panel 111.

The first support body 91 may be embodied as a pipe connecting the first support frame through-hole 611 extending through the support frame 61 and the first bar through-hole 291a defined in the top surface 291 of the first chamber to each other. The second support body 92 may be embodied as a pipe connecting the second support frame through-hole 613 and the second bar through-hole 291b to each other. Therefore, the first connection bar 623 and the second connection bar 643 may be inserted into the body through-holes defined in the first support body 91 and the second support body 92, respectively, so that one end thereof may be exposed to the first chamber 29, and the other end thereof may be disposed above the support frame 61. Further, a spacing between the support frame 61 and the first chamber top surface 291 will be maintained via the first support body 91 and the second support body 92.

In one example, the support frame 61 may further have a support frame guide 615 that guides a second wire connecting the motor 67 disposed on the second support and the control unit 781 to each other to a space defined between the first chamber 29 and the cabinet 1. The second wire may include a driving unit connection wire L33 disposed at the motor 67 and a second control wire L31 connected to the control unit 781 and disposed in the second chamber.

Furthermore, a support frame through-hole through which the lamp connection wire L53 disposed at the lamp 299 passes may be further defined in the support frame 61. The lamp connection wire L53 is connected to a third control wire L51 connected to the control unit 781. In this case, the support frame guide 615 would act as means for guiding the second wire L31 and L33 and third wire L51 and L53 to a space defined between the first chamber 29 and the cabinet 1.

Figure 14:
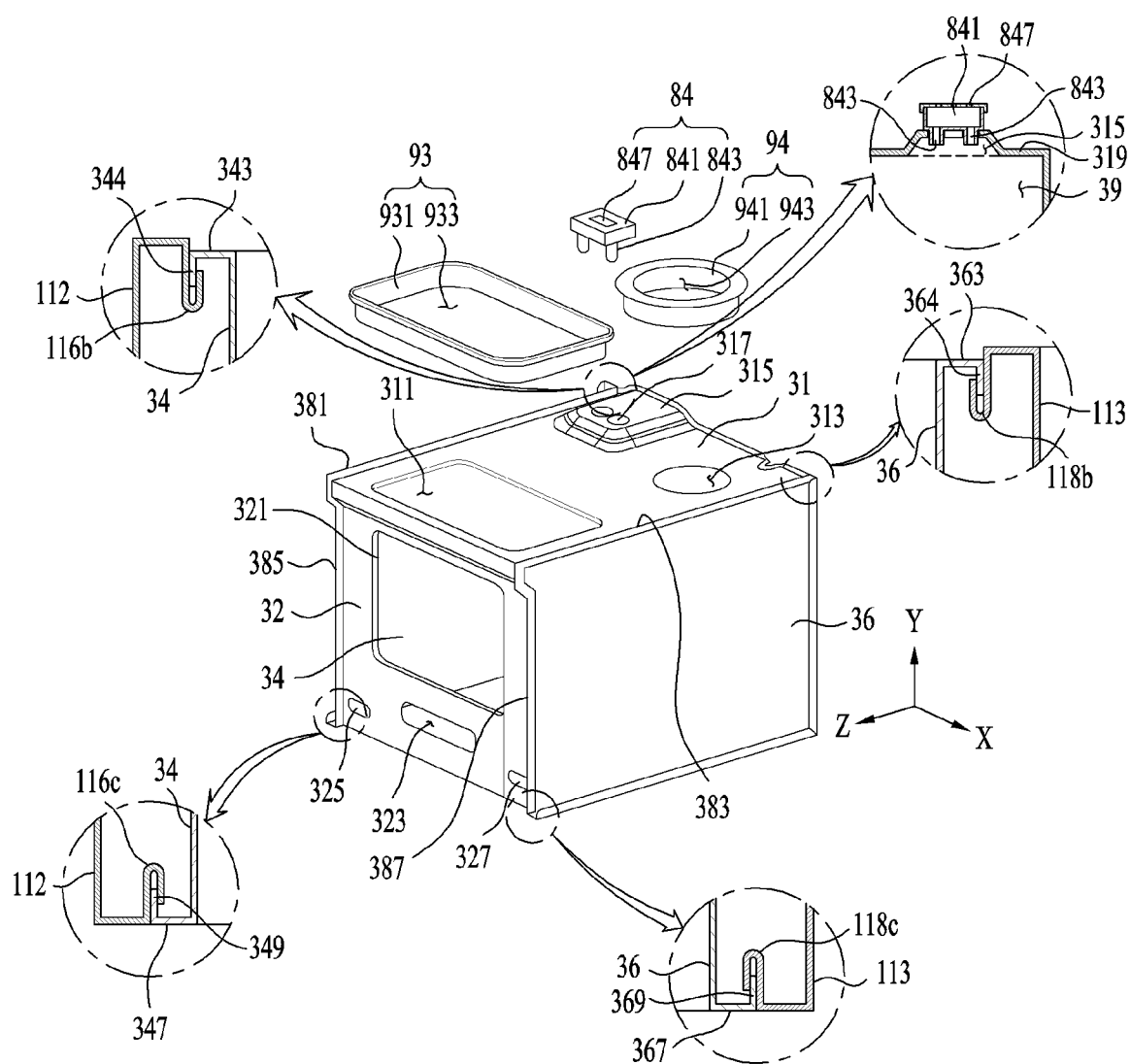
FIG. 14 shows one example of a second chamber defining structure.

FIG. 14 shows one example of the second chamber defining structure 3 included in a laundry treating apparatus according to the present disclosure. As shown in FIG. 14, the front panel 211 has a receiving-groove communication hole 321 communicating with a second chamber communication hole 233 defined in the tank receiving portion. When the receiving groove 231 is inserted into the receiving-groove communication hole 321, the second chamber communication hole 233 may be constructed to communicate with the inside of the second chamber 39. Further, the second chamber communication hole 233 and the receiving-groove communication hole 321 may be connected to each other when fixing the front panel 211 and the front frame 32 are coupled to each other via fasteners such as bolts.

Further, the front panel 211 may have a second outside-air intake hole 323 defined therein which communicates with the first outside-air intake hole 24. When the first outside-air intake hole 24 is disposed under the receiving groove 231, the second outside-air intake hole 323 may be disposed under the receiving-groove communication hole 321. The outside-air duct 76 disposed in the air supply unit is configured to connect the second outside-air intake hole 323 to the intake duct 71 or the connection duct 74.

The first outside-air intake hole 24 and the second outside-air intake hole 323 may be connected to each other via an outside-air guide 95. As shown in FIG. 9, the outside-air guide 95 may include a guide body 951 having one end fixed to the front panel 211 and the other end fixed to the front frame 32, and a guide through-hole 953 extending through the guide body 951 to connect the two outside-air intake holes 24 and 323 to each other. The guide body 951 may refer to means for maintaining a spacing between the front panel 211 and the front frame 32.

When the door 4 may select a position of the hinges 52 and 58 according to the user's choice, a first panel through-hole 251 and a second panel through-hole 253 may be defined in the front panel 211, and a first frame through-hole 325 and a second frame through-hole 327 may be defined in the front frame 32, as shown in FIG. 7.

The first panel through-hole 251 is defined in the front panel 211 and is adjacent to the first second-hinge mounting portion 271. The second panel through-hole 253 is defined in the front panel 211 and is adjacent to the second second-hinge mounting portion 273.

The first frame through-hole 325 may be connected to the first panel through-hole 251 via a first wire guide 96. The second frame through-hole 327 may be connected to the second panel through-hole 253 via a second wire guide 97. The first wire guide 96 and the second wire guide 97 may be embodied as pipes disposed between the front panel 211 and the front frame 32, and connecting the panel through-holes 251 and 253 to the frame through-holes 325 and 327 to each other, respectively.

Thus, when the hinges 52 and 58 are fixed to a left side of the front panel 211, the first control wire L11 and the control panel connection wire L13 will be connected to each other while being inserted into the first panel through-hole 251, the first wire guide 96, and the first frame through-hole 325. Conversely, when the hinges 52 and 58 are fixed to a right side of the front panel 211, the first control wire L11 and the control panel connection wire L13 will be connected to each other while being inserted into the second panel through-hole 253, the second wire guide 97, and the second frame through-hole 327.

When the door is constructed to be installed only on one of the left and right sides of the front panel 211, only one panel through-hole, one frame through-hole, and one wire guide may be present.

In one example, as shown in FIG. 9, in order to prevent the first second-hinge bracket 54 and the second second-hinge bracket 56 from interfering with the first wire guide 96 and second wire guide 97, a first wire guide through-hole 545 may be defined in the first second-hinge bracket 54, and a second wire guide through-hole 565 may be defined in the second second-hinge bracket 56. The second wire guide through-hole 565 may be embodied as a hole passing through the second front-panel fixing plate 561. The first wire guide through-hole 545 may be embodied as a hole passing through the first front-panel fixing plate 541.

When the door is configured to be installed only on one of the left and right sides of the front panel 211, only one panel through-hole, one frame through-hole, and one wire guide may be present.

As shown in FIG. 14, the top frame 31 may have a first fixing hole 311, a second fixing hole 313, and a supply pipe through-hole 317 defined therein. The intake duct 71 is detachably connected to the first fixing hole 311. The discharge duct 72 is detachably connected to the second fixing hole 313. The supply pipe 843 of the steam sprayer 84 is inserted into the supply pipe through-hole 317.

The first fixing hole 311 and the first chamber through-hole 297a defined in the bottom surface of the first chamber are connected to each other via a first flow channel defining portion 93. The second fixing hole 313 and the second chamber through-hole 297b are connected to each other via a second flow channel defining portion 94.

The first flow channel defining portion 93 may be configured to include a first flow channel body 931 constructed to maintain a spacing between the bottom surface 297 of the first chamber and the top frame 31, and a first body through-hole 933 extending through the first flow channel body 931 for connecting the first chamber through-hole 297a and the first fixing hole 311 to each other. The second flow channel defining portion 94 may be configured to include a second flow channel body 941 constructed to maintain a spacing between the bottom surface 297 of the first chamber and the top frame 31, and a second body through-hole 943 extending through the second flow channel body 941 for connecting the second chamber through-hole 297b and the second fixing hole 313 to each other.

The supply pipe through-hole 317 may be constructed to communicate with accommodating portions 315 formed by protruding the top frame 31 toward the bottom surface 297 of the first chamber. In this case, the accommodating portions 315 will be disposed at a top of the second chamber 39.

A free end of the supply pipe 843 may preferably have a length that the free end thereof is not exposed to an outside of the accommodating portions 315. When manufacturing the laundry treating apparatus 100, a device necessary for manufacturing the laundry treating apparatus may be inserted inside the second chamber 39. This is because when a length of the free end of the supply pipe 843 is larger than a height of the accommodating portions 315 (length thereof in a Y-axis direction), the supply pipe 843 may be damaged during manufacture of the laundry treating apparatus.

In rear of the top frame 31, a second bottom panel fastener 319 bent toward the chamber bottom surface 298 may be disposed. A bottom of the second rear panel 14b may be fixed to the second bottom panel fastener 319 via a bolt.

The first side frame 34 and the first side panel 112 of the cabinet are kept to be spaced from each other via a first spacer 343 and 347. The second side frame 36 and the second side panel 113 are kept to be spaced from each other via a second spacer 363 and 367.

The first spacer includes a first rear-panel supporting portion 343 extending from a rear end of the first side frame 34 toward the first side panel 112, and a first bottom-panel supporting portion 347 extending from a bottom of the first side frame 34 toward the first side panel 112. The second spacer includes a second rear-panel supporting portion 363 extending from a rear end of the second side frame 36 toward the second side panel 113, and a second bottom-panel supporting portion 367 extending from a bottom of the second side frame 36 toward the second side panel 113.

The first rear-panel supporting portion 343 and the first bottom-panel supporting portion 347 may be connected to each other to form an L-shape. The second rear-panel supporting portion 363 and the second bottom-panel supporting portion 367 may be connected to each other to form an L shape. This is intended to increase a strength of the first side frame 34 and the second side frame 36.

The second rear panel 14b may be detachably coupled to the first rear-panel supporting portion 343 and the second rear-panel supporting portion 363. The second bottom panel 16b may be detachably coupled to the first bottom-panel supporting portion 347 and the second bottom-panel supporting portion 367.

A first frame rear fastener 344 is disposed on the first rear-panel supporting portion 343. A first frame bottom fastener 349 is disposed on the first bottom-panel supporting portion 347. The first frame rear fastener 344 may be formed by bending a free end of the first rear-panel supporting portion 343 toward the front frame 32. The first frame bottom fastener 349 may be formed by bending a free end of the first bottom-panel supporting portion 347 towards the top frame 31.

The first frame rear fastener 344 may be coupled to the first rear fastener 116b disposed on the first side panel 112. The first frame bottom fastener 349 may be coupled to the first bottom fastener 116c of the first side panel.

A second frame rear fastener 364 is disposed on the second rear-panel supporting portion 363. The second frame bottom fastener 369 is disposed on the second bottom-panel supporting portion 367. The second frame rear fastener 364 may be formed by bending a free end of the second rear-panel supporting portion 363 toward the front frame 32. The second frame bottom fastener 369 may be formed by bending a free end of the second bottom-panel supporting portion 367 towards the top frame 31.

The second frame rear fastener 364 may be coupled to the second rear fastener 118b of the first side panel 112. The second frame bottom fastener 369 may be coupled to the second bottom fastener 118c of the first side panel.

Hereinafter, referring to FIG. 15 to FIG. 17, an assembly process of the laundry treating apparatus having the above-described structure will be described.

Figure 15:
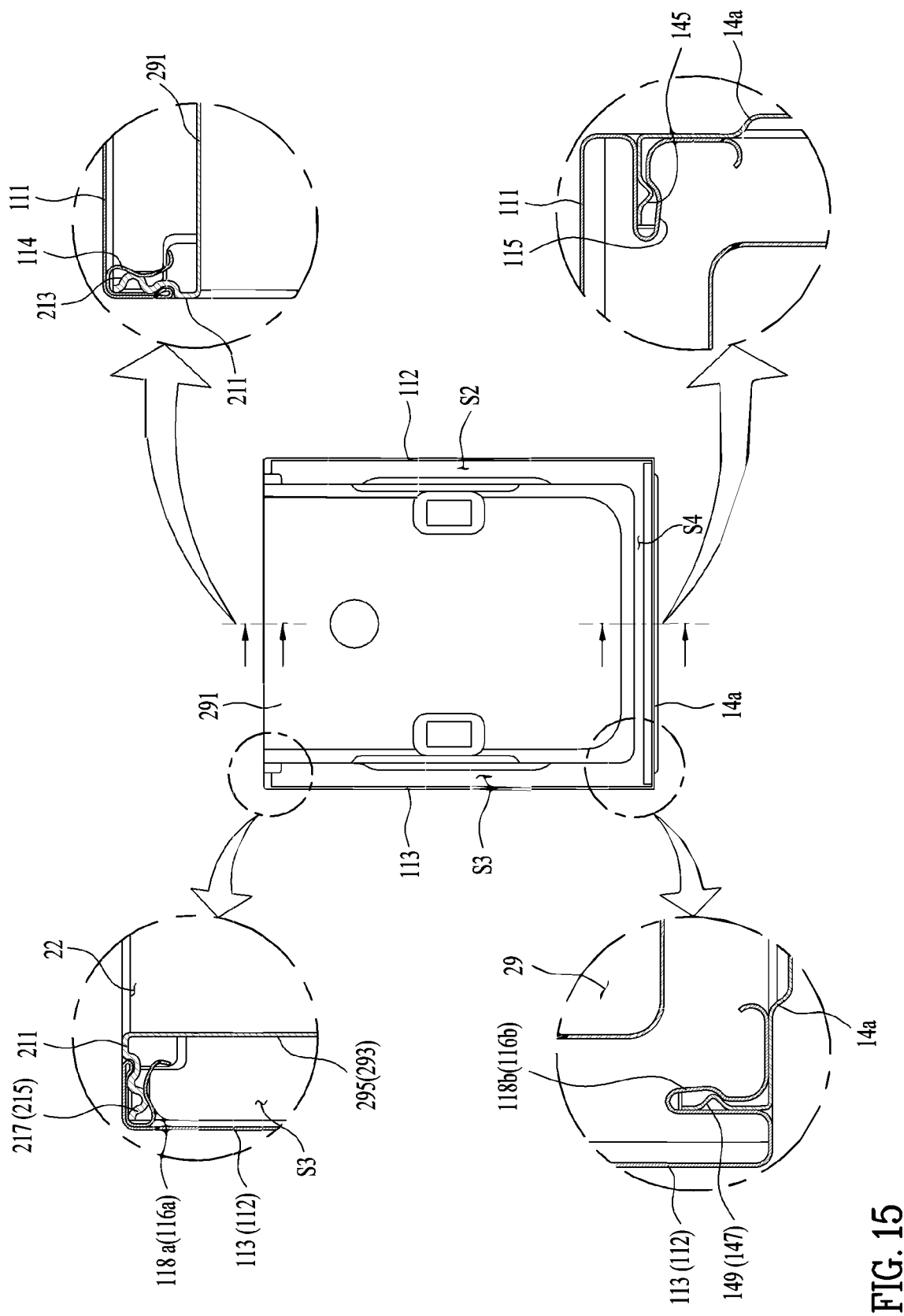
FIG. 15, FIG. 16, and FIG. 17 show one example of a coupling structure of a cabinet, a first chamber defining structure, and a second chamber defining structure.

As shown in FIG. 15, for assembly of the laundry treating apparatus 100 according to the present disclosure, an assembly worker first assembles the cabinet body 11 and the first chamber defining structure 2 with each other. That is, the assembly worker couples the top front-panel fastener 213 disposed on the front panel 211 to the front top-panel fastener 114 disposed on the cabinet body 11, and couples the first front-panel fastener 215 and the second front-panel fastener 217 to the first front fastener 116a and the second front fastener 118a respectively, such that the front panel 211 is coupled to the cabinet body 11

When the top and both sides of the front panel 211 are coupled to the top panel and both side panels of the cabinet body 11, respectively, the assembly worker couples the first bottom panel 16a to the cabinet body 11 and the front panel 211.

Figure 16:
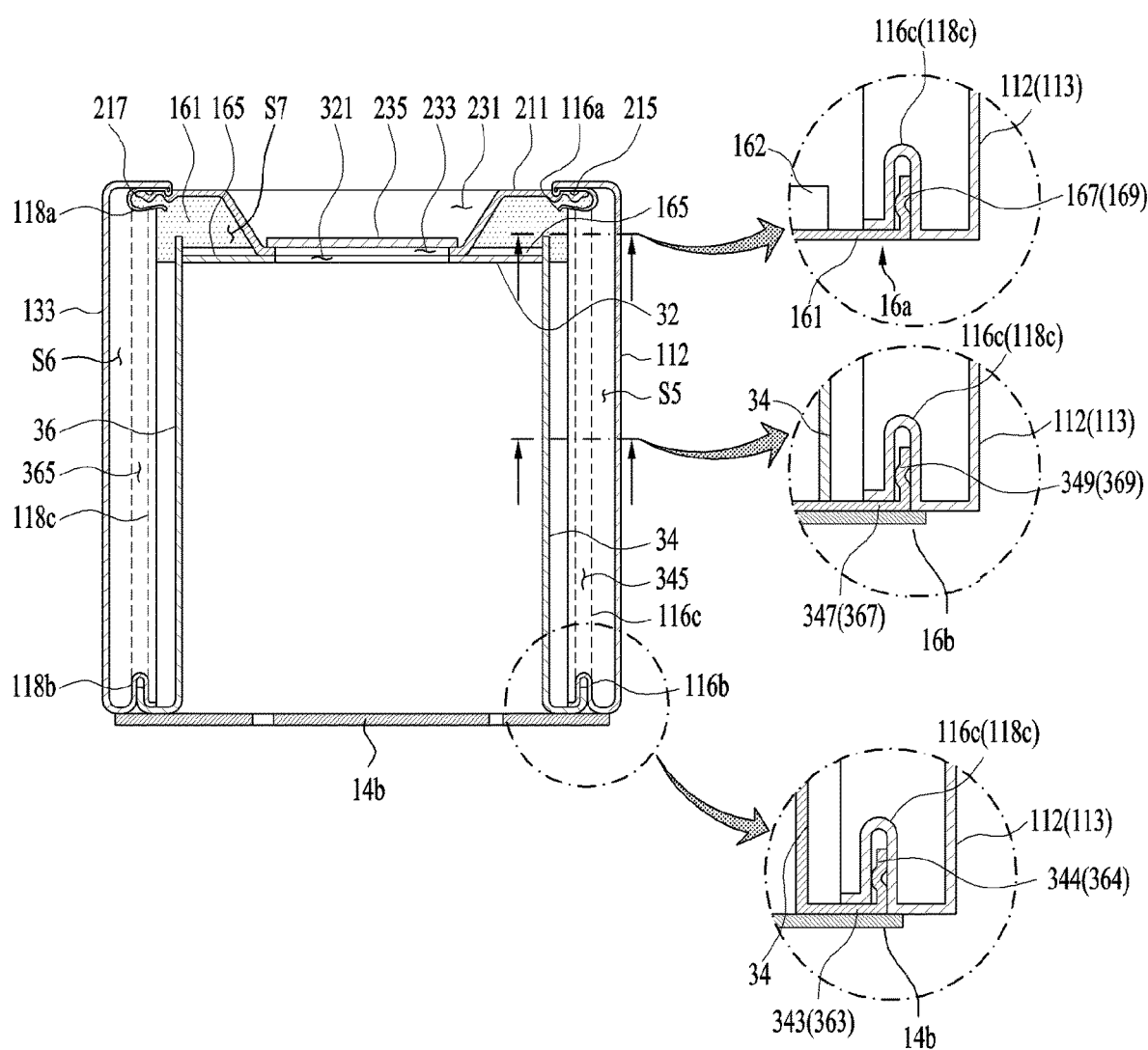

As shown in FIG. 16, the first bottom panel 16a is fixed to the cabinet body 11 when the first bottom-panel fastener 167 and the second bottom-panel fastener 169 disposed on both side surfaces of the panel body 161, respectively are coupled to the first bottom fastener 116c and the second bottom fastener 118c disposed on the bottom surfaces of the side panels 112 and 113, respectively.

In one example, in front of the panel body 161, the front bottom-panel fastener 162 is disposed which is coupled to the bottom front-panel fastener 219 disposed on a bottom of the front panel 211. Thus, the first bottom panel 16a is fixed to a bottom of the front panel 211 via the front bottom-panel fastener 162 and the bottom front-panel fastener 219 (see FIG. 9).

When the first bottom panel 16a is fixed to the bottom of the front panel 211, the assembly worker may assemble the second chamber defining structure 3 with the cabinet body 11.

As shown in FIG. 16, the assembly worker couples the first frame rear fastener 344 disposed on the rear surface of the second chamber defining structure 3 to the first rear fastener 116b defined on the rear surface of the first side panel, and couples the second frame rear fastener 364 disposed on the rear surface of the second chamber defining structure 3 to the second rear fastener 118b defined on the rear surface of the second side panel.

Further, the assembly worker may couple the first frame bottom fastener 349 and the second frame bottom fastener 369 disposed on the bottom surface of the second chamber defining structure 3 to the first bottom fastener 116c and the second bottom fastener 118c disposed on the bottom surfaces of the side panels, respectively.

When the cabinet body 11, the first chamber defining structure 2, the second chamber defining structure 3, and the bottom panel 16 are assembled with each other, the assembly worker fixes the second bottom panel 16b to the bottom surface of the second chamber defining structure 3. The second bottom panel 16b may be fixed to the first bottom-panel supporting portion 347 and the second bottom-panel supporting portion 367 of the second chamber defining structure via bolts or the like.

The assembly worker may then couple the first rear panel 14a to the cabinet body 11. As shown in FIG. 15, the first rear panel 14a may be coupled to the cabinet body 11 via the top rear-panel fastener 145, the first rear-panel fastener 147, and the second rear-panel fastener 149.

That is, when the top rear-panel fastener 145 is coupled to the rear top-panel fastener 115 of the cabinet body, the first rear-panel fastener 147 is coupled to the first rear fastener 116b, and the second rear-panel fastener 149 is coupled to the second rear fastener 118b, the first rear panel 14a will be fixed to the cabinet body 11. Further, the bottom of the first rear panel 14a is fixed to the second bottom panel fastener 319 disposed on the rear surface of the top frame 31.

When the assembly of the first rear panel 14a is completed, the assembly worker fixes the second rear panel 14b to the second chamber defining structure 3. As shown in FIG. 16, the second rear panel 14b may be fixed to the first rear-panel supporting portion 343 and the second rear-panel supporting portion 363 via bolts.

As shown in FIG. 15, in the above-described process, a top space S1 is defined between the top panel 111 and the chamber top surface 291. A first side space S2 is defined between the first side panel 112 and the first chamber side surface 293. A second side space S3 is defined between the second side panel 113 and the second chamber side surface 2395. A rear space S4 is defined between the first rear panel 14a and chamber rear surface 298. The top space S1, the first side space S2, the second side space S3, and the rear space S4 communicate with each other.

As shown in FIG. 16, a first connection space S5 connected to the first side space S2 is defined between the first side panel 112 and the first side frame 32. A second connection space S6 connected to the second side space is defined between the second side panel 113 and the second side frame 36. A front space S7 is defined between the front panel 11 and the front frame 31.

Further, a third connection space S8 (see FIG. 3) is defined by the top frame 31, the chamber bottom surface 297 of the first chamber, the first side panel 112, the second side panel 113, and the first rear panel 14a. A front surface of the third connection space S8 is connected to the front space S7. Both side surfaces of the third connection space S8 are connected to the first connection space S5 and the second connection space S6, respectively. A rear surface of the third connection space S8 is connected to the rear space S4.

The first connection space S5, the second connection space S6, the third connection space, and the front space S7 communicate with each other. Therefore, the spaces S1, S2, S3, S4, S5, S6, S7, and S8 defined between the cabinet 1, the first chamber 29 and the second chamber defining structure 3 may be connected to each other to form a single space.

In order to supply foam plastic to the foam spaces S1, S2, S3, S4, S5, S6, S7, and S8, a foam plastic inlet may be defined in the first rear panel 14a. As shown in FIG. 17, the foam plastic inlet may include a first foam plastic inlet 141 extending through the first rear panel 14a and communicating with the first side space S2, and a second foam plastic inlet 142 extending through the first rear panel 14a and communicating with the second side space S3.

Each of the first foam plastic inlet 141 and the second foam plastic inlet 142 may be embodied as a through-hole connected to an edge of the first rear panel 14a. The foam plastic injected through the first foam plastic inlet 141 and the second foam plastic inlet 142 may flow along the first chamber side surface 293 and second chamber side surface 295a and toward the bottom of the first side space S2 and the second side space S3. That is, a projection surface of the first rear panel 14a onto which the chamber rear surface 298 projects may be defined to interfere with the first foam plastic inlet 141 and the second foam plastic inlet 142.

The foam plastic means a synthetic resin having a porous structure. The porous structure of the synthetic resin may be achieved using a foaming agent. The foam plastic may be a functional composite material that imparts light weight, cushioning, sound insulation, thermal insulation, etc. The synthetic resin used as a raw material for the foam plastic may be one of polyurethane, polystyrene, polyolefin and polyolefin. In addition to the synthetic resins described above, phenolic resins, polyvinyl chloride, urea resins, silicone, polyimide and melamine resin may be used for the foam plastic.

In order to convert polyurethane into a foam form, the foaming agent incorporated into the polyurethane resin may be classified into a chemical foaming agent and a physical foaming agent. The chemical foaming agent forms bubbles via chemical reactions. The physical foaming agent forms bubbles via change in a physical state of a compressed gas or a phase change of liquid (evaporation).

A multiple of gas discharge holes 143 may be further defined in the first rear panel 14a. When a liquid foam plastic is injected into the spaces S1, S2, S3, S4, S5, S6, S7, and S8 through the first foam plastic inlet 141 and the second foam plastic inlet 142, the spaces will be filled with gas generated from a process of solidifying the foam plastic. The gas discharge hole 143 may refer to means for discharging the air and the gas from the spaces to the outside of the cabinet 1. According to the present disclosure, the gas discharge hole 143 may prevent the cabinet body 11 from being expanded or destroyed by the gas. A diameter of the gas discharge hole 143 is preferably set to be smaller than a diameter of each of the foam plastic inlets 141 and 142. This is intended to minimize leakage of the foam plastic through the gas discharge holes.

In one example, the holes defined in a top surface of the first chamber 29 and the holes defined in the support frame 61 are connected to each other via the first support body 91 and the second support body 92. Thus, the foam plastic supplied to the top space S1 will not leak into an inside of the first chamber 29 or out of the cabinet 1.

Further, since the foam plastic inserted into the top space S1 will serve to secure the first hinge bracket 51 inside the cabinet 1, the apparatus according to the present disclosure may prevent damage to the first chamber defining structure 2 due to the load of the door body 41.

The holes defined in the first chamber 29 and the holes defined in the second chamber 39 are connected to each other via the first flow channel defining portion 93, the second flow channel defining portion 94, and the spray body 841. Thus, the foam plastic injected into the third connection space S8 will not leak into the first chamber 29 or the second chamber 39.

Further, the holes defined in the front panel 211 and the holes defined in the front frame 32 are connected to each other via the outside-air guide 95 and the wire guides 96 and 97. Thus, the foam plastic injected into the front space S7 will not leak into the second chamber 39 and out of the cabinet 1.

Since the foam plastic injected into the front space S7 will serve to secure the second hinge brackets 54 and 56 inside the cabinet 1, the apparatus according to the present disclosure may prevent damage to the first chamber defining structure 2 due to the load of the door body 41.

As shown in FIG. 2, when the foam plastic is solidified inside the foam spaces S1, S2, S3, S4, S5, S6, S7, and S8, the top panel 111 and the chamber top surface 291 are fixed to each other via the foam plastic, and the first side panel 112 and the second side panel 113 are fixed to the first chamber side surface 293 and the second chamber side surface 295, respectively, and the first rear panel 14a is fixed to the chamber rear surface 298. Further, the chamber bottom surface 297 is fixed to the top frame 31, the front panel 211 is fixed to the front frame 32, and the first side frame 34 and the second side frame 36 are fixed to the first side panel 112 and the second side panel 113, respectively.

In the laundry treating apparatus 100 according to the present disclosure, the foam spaces S1, S2, S3, S4, S5, S6, S7, and S8 defined between the cabinet 1, the first chamber defining structure 2, and the second chamber defining structure 3 are filled with the foam plastic, such that the vibration of the cabinet 1 when the air supply unit 7, the moisture supply unit 8 and the second support 6b are operating may be minimized.

Further, in the laundry treating apparatus 100 according to the present disclosure, because a thermal insulator F as the foam plastic inserted into the foam spaces surrounds the first chamber 29, thereby to minimize loss of heat energy supplied to the first chamber 29.

As long as the foam plastic inserted into the foam spaces S1, S2, S3, S4, S5, S6, S7, and S8 defined between the cabinet 1, the first chamber defining structure 2, and the second chamber defining structure 3 is prevented from leakage to an outside of the cabinet, a coupling structures of the fasteners may be implemented in various ways.

Figure 17:
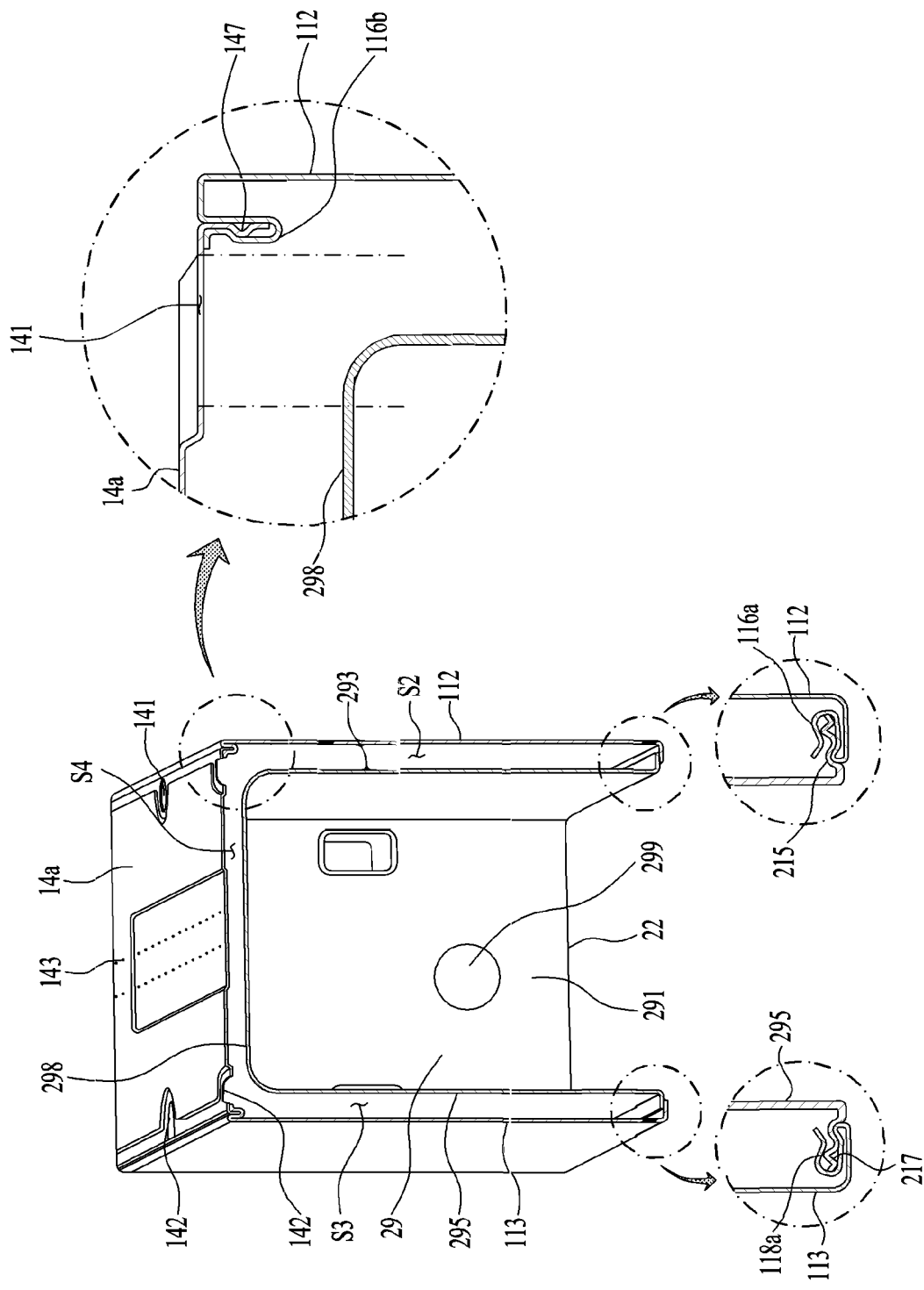

FIG. 15 to FIG. 17 show an example where the fasteners are press-fitted with each other.

As shown in FIG. 15, the top front-panel fastener 213 may be press-fitted into the front top-panel fastener 114. the first front-panel fastener 215 may be press-fitted into the first front fastener 116a. The second front-panel fastener 217 may be press-fitted into the second front fastener 118a.

Each of the top front-panel fastener 213, the first front-panel fastener 215, and the second front-panel fastener 217 may be embodied as a fastening plate protruding from each corner of the front panel. Each fastening plate disposed on the front panel may have a shape having a plurality of bending points.

The front top-panel fastener 114 may include a front surface defining portion that is bent from a front edge of the top panel 111 toward the laundry inlet 22 to define a portion of a front surface of the cabinet, a bent portion bent from a free end of the front surface defining portion toward the top panel 111, and a groove defining portion that is bent from a free end of the bent portion toward the chamber top surface 291 to define a groove into which the top front-panel fastener 213 is inserted.

The first front fastener 116a may include a front surface defining portion that is bent from a front edge of the first side panel 112 toward the laundry inlet 22 to define a portion of the front surface of the cabinet 1, a bent portion bent from a free end of the front surface defining portion toward the first side panel 112, and a groove defining portion that is bent from a free end of the bent portion toward the first chamber side surface 293 to define a groove into which the first front-panel fastener 215 is inserted.

The second front fastener 118a may include a front surface defining portion that is bent from a front edge of the second side panel 113 toward the laundry inlet 22 to define a portion of the front surface of the cabinet 1, a bent portion bent from a free end of the front surface defining portion toward the second side panel 113, and a groove defining portion bent from a free end of the bent portion toward the second chamber side surface 295 to define a groove into which the second front-panel fastener 217 is inserted.

As shown in FIG. 9, the bottom front-panel fastener 219 may be constructed to be press-fitted into the front bottom-panel fastener 162. In this case, the bottom front-panel fastener 219 is embodied as a fastening plate extending from a bottom of the front panel 211, and having a plurality of bending points. The front bottom-panel fastener 162 may be constructed to define a groove into which the bottom front-panel fastener 219 is inserted.

That is, the front bottom-panel fastener 162 may include a front surface defining portion that is bent from a front edge of the panel body 161 toward the front panel 211 to define a portion of the front surface of the cabinet, a bent portion bent from a free end of the front surface defining portion toward the panel body 161, and a groove defining portion that is bent from an edge of the bent portion toward the front panel 211 to define a groove into which the bottom front-panel fastener 219 is inserted.

As shown in FIG. 15, the top rear-panel fastener 145, the first rear-panel fastener 147 and the second rear-panel fastener 149 disposed on the first rear panel 14a may be constructed to be press-fitted into the rear top-panel fastener 115, the first rear fastener 116b, and the second rear fastener 118b, respectively.

The top rear-panel fastener 145 may be embodied as a fastening plate bent from a top of the first rear panel 14a toward the chamber rear surface 298. The first rear-panel fastener 147 and the second rear-panel fastener 149 may be embodied as fastening plates bent from left and right ends of the first rear panel 14a toward the chamber rear surface 298, respectively. The fastening plate disposed on each rear panel may have a plurality of bending points.

The rear top-panel fastener 115 may include a rear surface defining portion formed by bending a rear edge of the top panel 16 toward the bottom panel 16 to define a portion of the rear surface of the cabinet 1, a bent portion bent from a free end of the rear surface defining portion toward the chamber rear surface, and a groove defining portion that is bent from a free end of the bent portion toward the first rear panel 14a to define a groove into which the top rear-panel fastener 145 is inserted.

The first rear fastener 116b may include a rear surface defining portion formed by bending a rear edge of the first side panel 112 toward the second side panel 113 to define a portion of the rear surface of cabinet 1, a bent portion bent from a free end of the rear surface defining portion toward the front surface of the cabinet, and a groove defining portion that is bent from a free end of the bent portion toward the first rear panel 14a to define a groove into which the first rear-panel fastener 147 is inserted.

The second rear fastener 118b may include a rear surface defining portion formed by bending a rear edge of the second side panel 113 toward the first side panel 112 to define a portion of the rear surface of cabinet 1, a bent portion bent from a free end of the rear surface defining portion toward the front surface of the cabinet, and a groove defining portion that is bent from a free end of the bent portion toward the first rear panel 14a to define a groove into which the second rear-panel fastener 149 is inserted.

As shown in FIG. 16, the first bottom-panel fastener 167 and the second bottom-panel fastener 169 disposed on opposite sides of the first bottom panel 16a, respectively may be constructed to be press-fitted into the first bottom fastener 116c and second bottom fastener 118c, respectively.

The first bottom-panel fastener 167 may be embodied as a fastening plate bent upward from one end of the panel body 161. The second bottom-panel fastener 169 may be embodied as a fastening plate bent upward from the other end of the panel body 161. Each fastening plate disposed on the first bottom panel may have a plurality of bending points.

The first bottom fastener 116c may include a bottom surface defining portion formed by bending a bottom of the first side panel 112 toward the second side panel 113 to define a portion of the bottom surface of the cabinet, a bent portion bent from a free end of the bottom surface defining portion toward the top panel 111, and a groove defining portion that is bent from a free end of the bent portion toward the panel body 161 to define a groove into which the first bottom-panel fastener 167 is forcibly fitted The second bottom fastener 118c may include a bottom surface defining portion formed by bending a bottom of the second side panel 113 toward the first side panel 112 to define a portion of the bottom surface of the cabinet, a bent portion bent from a free end of the bottom surface defining portion toward the top panel 111, and a groove defining portion that is bent from a free end of the bent portion toward the panel body 161 to define a groove into which the second bottom-panel fastener 169 is forcibly fitted.

In one example, the first frame bottom fastener 349 disposed on the first side frame 34 and the second frame bottom fastener 369 disposed on the second side frame 36 may be constructed to be press-fitted into the second bottom fastener 116c and the second bottom fastener 118c, respectively. The first frame bottom fastener 349 may be embodied as a fastening plate formed by bending a free end of the first bottom-panel supporting portion 347 toward the first bottom fastener 116c. The second frame bottom fastener 369 may be embodied as a fastening plate formed by bending a free end of the second bottom-panel supporting portion 367 toward the second bottom fastener 118c. Each fastening plate disposed on a bottom surface of the second chamber defining structure may have a plurality of bending points.

The first frame rear fastener 344 and second frame rear fastener 364 may be constructed to be press-fitted into to the first bottom fastener 116c and the second bottom fastener 118c, respectively. The first frame rear fastener 344 may be embodied as a fastening plate formed by bending a free end of the first rear-panel supporting portion 343 toward the first rear fastener 116b. The second frame rear fastener 364 may be embodied as a fastening plate formed by bending a free end of the second rear-panel supporting portion 363 toward the second rear fastener 118b. Each fastening plate disposed on a rear surface of the second chamber defining structure may have a plurality of bending points.

As shown in FIG. 7, the laundry treating apparatus 100 according to the present disclosure may further include a first reinforcing frame 112a and a second reinforcing frame 113a respectively disposed in a space defined between the first side frame 34 and the first side panel 112, and a space defined between the second side frame 36 and the first side panel 113

A thickness of the first connection space S5 (see FIG. 16) defined between the first side frame 34 and the first side panel 112 may be smaller than a thickness of the second space S2 (refer to FIG. 15) defined between the first chamber side surface 293 and the first side panel 112. The first reinforcing frame 112a may refer to means for increasing a strength of the first connection space S5.

Further, a thickness of the second connection space S6 (see FIG. 16) defined between the second side frame 36 and the second side panel 113 may be smaller than that of the third space S3 defined between the second chamber side surface 295 and the second side panel 113. Therefore, the second reinforcing frame 113a may refer to means for increasing a strength of the second connection space S6.

The first reinforcing frame 112a may be embodied as an L-shaped bar fixed to a rear corner of a bottom of the first side panel 112. The second reinforcing frame 113a may be embodied as an L-shaped bar fixed to a rear corner of a bottom of the second side panel 113.

Furthermore, in order to increase a strength of the third connection space S8 (see FIG. 3) defined between the chamber bottom surface 297 and the top frame 31, a plurality of ribs may be further disposed in the second chamber defining structure 3.

As shown in FIG. 14, the ribs may include a first top rib 381 and a second top rib 383 disposed on opposite sides of the top frame 31, respectively. The first top rib 381 may be embodied as a plate protruding from a top of the first side frame 34 toward the chamber bottom surface 297. The second top rib 383 may be embodied as a plate extending from a top of the second side frame 36 toward the chamber bottom surface 297.

Further, the ribs may further include a first side rib 385 and a second side rib 387 disposed on both sides of the front frame 32, respectively. The first side rib 385 may be embodied as a plate protruding from a front end of the first side frame 34 toward the front panel 211. The second front rib 387 may be embodied as a plate extending from a front end of the second side frame 36 toward the front panel 211.

When the foam plastic flowing into the third connection space S8 is solidified, the aforementioned ribs 381, 383, 385, and 387 will increase a coupling force between the chamber bottom surface 297 and the second chamber defining structure 3. Thus, according to the present disclosure, the ribs may increase a strength of the third connection space.

Further, the ribs 381, 383, 385, and 387 will also serve to guide a liquid foam plastic flowing into the rear space S4 to the third connection space S8 and the front space S7.

As shown in FIG. 8, in order to prevent inflow of contaminants such as water into the control unit 781, the receiving-portion body 78 may further include a control unit housing 783 which provides a space for accommodating therein the control unit 781, and has a shape open toward the second rear panel 14a.

The present disclosure may be modified and embodied in various forms, and a scope of a right thereof is not limited to the above-described embodiments. Therefore, when the modified embodiment includes elements of following claims, the modified embodiment should be considered to belong to a scope of the present disclosure.

What is claimed is:

1. A laundry treating apparatus comprising:
    a cabinet including:
        a first side panel and a second side panel opposite to each other;
        a top panel and a bottom panel connecting the first side panel and the second side panel to each other and defining top and bottom surfaces of the cabinet, respectively; and
        a rear panel defining a rear surface of the cabinet;
    a first base including:
        a front panel fixed to the first side panel, the second side panel, the top panel, and the bottom panel and defining a front surface of the cabinet; and
        a laundry inlet extending through the front panel;
    a first chamber fixed to the front panel and disposed inside the cabinet, wherein the first chamber has a laundry receiving space defined therein communicating with the laundry inlet;
    a second base including:
        a front frame disposed between the front panel and the rear panel;
        a top frame extending from the front frame toward the rear panel and spaced apart from a bottom surface of the first chamber; and
        a first side frame spaced apart from the first side panel, and a second side frame spaced apart from the second side panel;
    a second chamber defined by the front frame, the top frame, the first side frame, the second side frame, the bottom panel, and the rear panel;
    a flow channel defining portion configured to communicate with the first chamber and the second chamber;
    an air supply unit disposed inside the second chamber, and configured to supply air to the first chamber through the flow channel defining portion;
    a door for opening and closing the laundry inlet;
    a first hinge for connecting the door to a portion of the front panel disposed above the laundry inlet;
    a second hinge for connecting the door to a portion of the front panel disposed below the laundry inlet;
    a first hinge bracket fixed to the front panel and disposed inside the cabinet, wherein the first hinge bracket fixes the first hinge to the front panel; and
    a foam plastic inserted into a foam space defined between the cabinet, the first base, the first chamber, and the second base.

2. The apparatus of claim 1, wherein the foam space includes:
    a space defined between the first chamber and the top panel;
    a space defined between the first chamber and the first side panel;
    a space defined between the first chamber and the second side panel;
    a space defined between the first chamber and the rear panel;

a space defined between the first chamber and the top frame;
a space defined between the front panel and the front frame;
a space defined between the first side frame and the first side panel; and
a space defined between the second side frame and the second side panel.

3. The apparatus of claim 2, wherein the foam plastic includes one of polyurethane, polystyrene, and polyolefin.

4. The apparatus of claim 2, wherein the apparatus further comprises:
a first mounting portion recessed in the front panel toward an inside of the cabinet;
a first first-hinge mounting portion disposed on a left side of the first mounting portion, wherein the first first-hinge mounting portion protrudes from the front panel toward the inside of the cabinet, and the first first-hinge mounting portion has a first groove defined therein, wherein the first hinge is fixedly received in the first groove;
a second first-hinge mounting portion disposed on a right side of the first mounting portion, wherein the second first-hinge mounting portion protrudes from the front panel toward the inside of the cabinet, and the second first-hinge mounting portion has a second groove defined therein, wherein the first hinge is fixedly received in the second groove;
a second mounting portion recessed in an exposed surface of the front panel toward the inside of the cabinet;
a first second-hinge mounting portion disposed on a left side of the second mounting portion, wherein the first second-hinge mounting portion protrudes from the front panel toward the inside of the cabinet, and the first second-hinge mounting portion has a third groove defined therein, wherein the second hinge is fixedly received in the third groove; and
a second second-hinge mounting portion disposed on a right side of the second mounting portion, wherein the second second-hinge mounting portion protrudes from the front panel toward the inside of the cabinet, and the second second-hinge mounting portion has a fourth groove defined therein, wherein the second hinge is fixedly received in the fourth groove.

5. The apparatus of claim 4, wherein the first hinge bracket includes:
a bracket body fixed to the first mounting portion and disposed in a space defined between the first chamber and the top panel;
a first receiving portion defined in the bracket body and constructed to accommodate therein the first first-hinge mounting portion; and
a second receiving portion defined in the bracket body and constructed to accommodate therein the second first-hinge mounting portion.

6. The apparatus of claim 5, wherein the apparatus further comprises:
a first position-fixing portion protruding from the first mounting portion toward the bracket body; and
a second position-fixing portion defined in the bracket body and constructed to accommodate therein the first position-fixing portion.

7. The apparatus of claim 5, wherein the first receiving portion and the second receiving portion are symmetrical shapes with respect to a central line virtually passing through the center of the bracket body along a height of the cabinet.

8. The apparatus of claim 4, wherein the bottom panel includes:
a first bottom panel having a front surface fixed to the front panel, a rear surface fixed to the front frame, and both side surfaces fixed to a bottom surface of the first side panel and a bottom surface of the second side panel, respectively; and
a second bottom panel having a front surface connected to a rear surface of the first bottom panel, and both side surfaces fixed to a bottom surface of the first side panel and a bottom surface of the second side panel, respectively, wherein the second bottom panel is disposed below the second base.

9. The apparatus of claim 8, wherein the apparatus further comprises a panel connector for connecting a rear surface of the first bottom panel and a front surface of the second bottom panel to each other.

10. The apparatus of claim 8, wherein the apparatus further comprises:
a first second-hinge bracket for fixing the first second-hinge mounting portion and the first bottom panel;
a second second-hinge bracket for fixing the second second-hinge mounting portion and the first bottom panel;
a first leg coupled to at least one of the first second-hinge bracket or the first bottom panel; and
a second leg coupled to at least one of the second second-hinge bracket or the first bottom panel.

11. The apparatus of claim 10, wherein the first second-hinge bracket includes:
a first front-panel fixing plate fixed to the first second-hinge mounting portion, wherein the second hinge is detachably coupled to the first front-panel fixing plate; and
a first bottom-panel fixing plate extending from the first front-panel fixing plate, wherein the first bottom panel is fixed to the first bottom-panel fixing plate, wherein the second second-hinge bracket includes:
a second front-panel fixing plate fixed to the second second-hinge mounting portion, wherein the second hinge is detachably coupled to the second front-panel fixing plate; and
a second bottom-panel fixing plate extending from the second front-panel fixing plate, wherein the first bottom panel is fixed to the second bottom-panel fixing plate.

12. The apparatus of claim 11, wherein the apparatus further comprises:
a control panel fixed to the door, wherein the control panel includes at least one of a display for displaying a control command or an input interface for receiving a control command;
a control unit disposed inside the second chamber;
a first panel through-hole extending through the front panel, and communicating with the second mounting portion;
a second panel through-hole extending through the front panel, and communicating with the second mounting portion;
a first chamber through-hole extending through the front frame;
a second chamber through-hole extending through the front frame;
a first wire guide for connecting the first panel through-hole and the first chamber through-hole to each other, wherein a wire connecting the control panel and the control unit to each other is insertable into the first wire guide; and a second wire guide for connecting the second panel through-hole and the second chamber through-hole to each other, wherein a wire connecting the control panel and the control unit to each other is insertable into the second wire guide.

13. The apparatus of claim 12, wherein the apparatus further comprises:
a first guide through-hole extending through the first front-panel fixing plate, wherein the first wire guide is inserted into the first guide through-hole; and
a second guide through-hole extending through the second front-panel fixing plate, wherein the second wire guide is inserted into the second guide through-hole.

14. The apparatus of claim 4, wherein the apparatus further comprises:
a first cover body detachably disposed on the first mounting portion to prevent exposure of the first first-hinge mounting portion and the second first-hinge mounting portion to an outside;
a first hinge through-hole extending through the first cover body, wherein the first hinge is inserted into the first hinge through-hole;
a first door magnetic body disposed in the door;
a first cover magnet disposed in the first cover body for providing an attractive force pulling the door magnetic body toward the first cover body.

15. The apparatus of claim 14, wherein the apparatus further comprises:
a second cover body detachably disposed on the second mounting portion to prevent exposure of the first second-hinge mounting portion and the second second-hinge mounting portion to an outside; and
a second hinge through-hole extending through the second cover body, wherein the second hinge is inserted into the second hinge through-hole.

16. The apparatus of claim 15, wherein the apparatus further comprises:

a third mounting portion embodied as a groove recessed in the front panel, wherein the third mounting portion is positioned between a bottom of the laundry inlet and a top of the second mounting portion;
a third cover body detachably coupled to the third mounting portion;
a second door magnetic body disposed in the door; and
a third cover magnet disposed in the third cover body for providing an attractive force pulling the second door magnetic body toward the third cover body.

17. The apparatus of claim 1, wherein the foam space includes a top space defined between the first chamber and the top panel, and
wherein the foam plastic inserted into the top space secures the first hinge bracket in the cabinet.

18. The apparatus of claim 1, further comprising a second hinge bracket fixed to the front panel and disposed inside the cabinet,
wherein the first hinge bracket supports the second hinge.

19. The apparatus of claim 18, wherein the second hinge bracket includes a first second-hinge bracket and a second second-hinge bracket, and
wherein the first second-hinge bracket is located at a front panel and closer to the first side panel than the second side panel, and the second second-hinge brackets is located at a front panel and closer to the second side panel than the first side panel.

20. The apparatus of claim 1, further comprising:
a steam sprayer including a spray body configured to communicate with the first chamber and the second chamber; and
a steam generator disposed inside the second chamber, the steam generator being configured to supply steam to the first chamber through the steam sprayer.

* * * * *